United States Patent
Barcus et al.

(10) Patent No.: US 12,551,168 B2
(45) Date of Patent: Feb. 17, 2026

(54) ENHANCED PULSE OXIMETRY SYSTEMS AND METHODS FOR THE DIAGNOSES OF SLEEP-ASSOCIATED BREATHING DISORDERS

(71) Applicant: Cadwell Laboratories, Inc., Kennewick, WA (US)

(72) Inventors: Scott Barcus, Kennewick, WA (US); James Blevins, Portland, OR (US); John A. Cadwell, Richland, WA (US); Kacee Giger, Kennewick, WA (US); Colton Wallin, Pasco, WA (US)

( * ) Notice: Subject to any disclaimer, the term of this patent is extended or adjusted under 35 U.S.C. 154(b) by 375 days.

(21) Appl. No.: 18/067,073

(22) Filed: Dec. 16, 2022

(65) Prior Publication Data

US 2023/0190206 A1    Jun. 22, 2023

Related U.S. Application Data

(60) Provisional application No. 63/265,881, filed on Dec. 22, 2021.

(51) Int. Cl.
| | | |
|---|---|---|
| A61B 5/1455 | (2006.01) | |
| A61B 5/00 | (2006.01) | |
| A61B 5/08 | (2006.01) | |

(52) U.S. Cl.
CPC ........ *A61B 5/7267* (2013.01); *A61B 5/14551* (2013.01); *A61B 5/7289* (2013.01); *A61B 5/743* (2013.01); *A61B 5/0826* (2013.01)

(58) Field of Classification Search
CPC . A61B 5/0205; A61B 5/02055; A61B 5/0816; A61B 5/14551; A61B 5/7267; A61B 5/02416; A61B 5/7264; A61B 5/742; A61B 5/01; A61B 5/4818; A61B 5/11; A61B 5/7282; A61B 5/14542; A61B 5/1455; A61B 5/08; A61B 5/4809; A61B 5/7225; A61B 5/486; A61B 5/7246; A61B 5/0261; A61B 5/4806; A61B 5/0059; A61B 5/4815; A61B 5/0295; A61B 5/24; A61B 5/00; A61B 5/68; A61B 5/02

See application file for complete search history.

(56) References Cited

U.S. PATENT DOCUMENTS

| | | |
|---|---|---|
| 4,579,125 A | 4/1986 | Strobl |
| 4,776,345 A | 10/1988 | Cohen |
| 4,781,195 A | 11/1988 | Martin |

(Continued)

FOREIGN PATENT DOCUMENTS

| | | |
|---|---|---|
| JP | 2003202834 | 7/2003 |
| JP | 2005134546 | 5/2005 |

*Primary Examiner* — Deborah L Malamud
(74) *Attorney, Agent, or Firm* — Novel IP

(57) ABSTRACT

The present specification describes a system and method of detecting sleep disordered breathing, that includes acquiring a set of unconditioned sleep test data that includes oximetry data and at least one other physiological sensor data; sampling the set of unconditioned sleep test data; storing the sampled set of unconditioned sleep test data; receiving, through a display, an input indicative of a degree of analyzing to be applied to the sampled set of unconditioned sleep test data; based on said input, applying a corresponding degree of analyzing to the unprocessed sleep test data to generate processed sleep test data; and visually displaying the processed sleep test data.

16 Claims, 8 Drawing Sheets

(56) References Cited

U.S. PATENT DOCUMENTS

| | | |
|---|---|---|
| 5,299,118 A | 3/1994 | Martens |
| 5,732,696 A | 3/1998 | Rapoport |
| 5,813,993 A | 9/1998 | Kaplan |
| 5,953,713 A | 9/1999 | Behbehani |
| RE36,450 E | 12/1999 | Musha |
| 5,999,846 A | 12/1999 | Pardey |
| 6,011,986 A | 1/2000 | Diab |
| 6,070,098 A | 5/2000 | Moore-Ede |
| 6,083,173 A | 7/2000 | Grant |
| 6,397,091 B2 | 5/2002 | Diab |
| 6,805,668 B1 | 10/2004 | Cadwell |
| 6,825,619 B2 | 11/2004 | Norris |
| 6,870,109 B1 | 3/2005 | Villarreal |
| 6,993,371 B2 | 1/2006 | Kiani |
| 7,072,521 B1 | 7/2006 | Cadwell |
| 7,230,688 B1 | 6/2007 | Villarreal |
| 7,365,713 B2 | 4/2008 | Kimura |
| 7,374,448 B2 | 5/2008 | Jepsen |
| 7,914,350 B1 | 3/2011 | Bozich |
| 8,035,109 B2 | 10/2011 | Kimura |
| D670,656 S | 11/2012 | Jepsen |
| 8,666,467 B2 | 3/2014 | Lynn |
| 9,155,503 B2 | 10/2015 | Cadwell |
| 9,295,401 B2 | 3/2016 | Cadwell |
| 9,730,634 B2 | 8/2017 | Cadwell |
| 2003/0117352 A1 | 6/2003 | Kimura |
| 2014/0121555 A1 | 5/2014 | Scott |
| 2014/0275926 A1 | 9/2014 | Scott |
| 2016/0000382 A1 | 1/2016 | Jain |
| 2016/0022204 A1* | 1/2016 | Mostov ............... A61B 5/7282 600/301 |
| 2016/0174861 A1 | 6/2016 | Cadwell |
| 2019/0008450 A1 | 1/2019 | Gurievsky |
| 2019/0365315 A1 | 12/2019 | Ramabadran |
| 2022/0287581 A1 | 9/2022 | Kito |

* cited by examiner

ENHANCED PULSE OXIMETRY SYSTEMS AND METHODS FOR THE DIAGNOSES OF SLEEP-ASSOCIATED BREATHING DISORDERS

CROSS-REFERENCE

The present application relies on U.S. Patent Provisional Application No. 63/265,881, titled "Enhanced Pulse Oximetry Systems and Methods for the Diagnoses of Sleep-Associated Breathing Disorders", and filed on Dec. 22, 2021, for priority, which is herein incorporated by reference in its entirety.

FIELD

The present specification generally relates to the fields of screening for and/or diagnosing sleep-associated breathing disorders. More particularly, the present specification relates to an enhanced pulse oximetry system as part of a polysomnography, a Home Sleep Apnea Test (HSAT) or Home Sleep Test (HST), a sleep oximetry system or other sleep testing system configured to aid in the diagnosis of sleep disordered breathing.

BACKGROUND

Patients with sleep apnea and certain other sleep disorders stop breathing or experience reduced airflow or other breathing irregularities, during sleep. A typical sleep study is based on a respiratory disturbance index (RDI). The RDI may be based on a number of abnormal breathing events per hour of sleep, including apnea events, hypopnea events, and respiratory-effort related arousals (RERAs). The resulting drop in oxygen levels in the blood, known as desaturation, disrupts the individual's sleep and eventually arouses the patient in order to cause the patient to start breathing again. This is referred to as an arousal event (RERA). Frequent desaturation causes a variety of negative physiological side effects such as diminished sleep quality, daytime drowsiness, attention and memory retention issues, and long term cardiac and other systemic problems. A diagnostic sleep study uses pulse oximetry to continuously record the oxygen level in the blood, as well as respiratory movements of the chest and abdomen, air flow through the nose and mouth, among other metrics. Oxygen is measured as saturated oxygen level (SpO2) which is the percentage of oxygen bound hemoglobin (oxyhemoglobin) relative to total hemoglobin.

Conventional pulse oximeters are designed and optimized to measure constant or slowly changing blood oxygen levels in a hospital clinical unit and configured to alert caregivers when a patient's SPO2 level drops, indicating a troublesome respiratory or cardiac trend. In order to give stable readings and to prevent false alerts, the conventional pulse oximetry signals are heavily filtered to remove artifacts and averaged or smoothed to discount transient drops in oxygen levels. Accordingly, in such systems, abrupt changes in detected saturated oxygen level (SpO2) will not settle to a final measured value for up to 20 seconds and alerts to such a drop will be delayed for an additional period of time.

Sleep apnea is diagnosed in part by the number, duration, and degree of desaturation of apneic events. Even short duration apneic events (under 30 seconds) may cause arousal and serious sleep disruption. Conventional pulse oximeters typically under-report the occurrence and severity of such events.

Further, conventional pulse oximeters and their signal processing systems are optimized for patient monitoring settings that avoid detecting or isolating non-threatening or non-critical desaturation events which do not require intervention and are not relevant to the medical setting. They do so by applying time averaging and other noise reducing signal processing techniques to raw pulse oximetry signals in near real time.

Apneic events are when the patient stops breathing temporarily. Apneic events are fundamentally different from the systemic problems monitored by conventional pulse oximeters in the hospital or ICU. During an apneic event the SpO2 drops rapidly and also recovers rapidly upon arousal. Such conventional devices can miss these short episodes of desaturation and, therefore, will underreport the number and severity of apneic events. A hypopnea event, which is similar to a partial apnea event, results in reduced airflow, in the order of 30% or more compared to a baseline, during a 10 second event. Further, a RERA event, also described above, results in abnormal breathing, and is noted by an EEG (electroencephalogram) as an 'arousal' during the sleep study. Additional respiratory events of interest include stopping of airflow, reduced airflow, and any other respiratory disturbance that results in arousal.

U.S. Pat. No. 8,666,467 describes a system and method for analyzing data. An exemplary method comprises receiving data corresponding to at least one time series, and computing a plurality of sequential instability index values of the data. The disclosed embodiments comprise receiving data corresponding to at least one time series, and computing a plurality of sequential instability index values of the data and the disclosed systems comprise a source of data indicative of at least one time series of data, and a processor that is adapted to compute at least one of a plurality of sequential instability index values of the data. However, the system does not solve the failure to fully detect desaturation events which do not require intervention and are not relevant to the medical setting.

US Patent Publication Number 20190008450 discloses an apparatus and method for the early detection, output and treatment of sleep disorders. The disclosed devices comprise a support element configured and arranged to detachably attach over a skin region of a chest area of a subject, an optical sensor assembly mounted to said support element and configured and arranged to conduct optical measurements in the chest area and generate optical measurement data indicative of one or more parameters of the subject, a volumetric sensor assembly mounted to the support element and configured and operable to measure chest expansions and retractions of the subject and generate volumetric measurement data indicative of the expansions and retractions of the chest of the subject, and a control unit mounted to the support element and configured and operable to process the optical and volumetric measurement data for removing interferences introduced into the optical measurements due to the chest expansions and retractions. However, the apparatus does not provide optimal output for accurately measuring the short desaturation events.

US Patent Publication Number 20190365315 describes systems and methods for conducting a sleep test by initiating a sleep test script and providing the script to a patient. Testing hardware is shipped hardware from a provider to the patient, and instructions are provided to the patient for connecting the testing hardware to a mobile computing device. A mobile sleep application is downloaded and installed onto the mobile computing device. The testing hardware is connected to patient and the mobile computing device, and the sleep test is conducted using the mobile sleep application operating on the mobile computing device. Again, the apparatus does not provide optimal output for accurately measuring the short desaturation events.

Therefore, there is a need for an enhanced pulse oximetry system that responds rapidly and more accurately to saturation changes while mitigating inherent noise that occurs during these measurements. There is also a need for systems that can more accurately report an occurrence and severity of apnea, hypopnea, RERA events, and other sleep related breathing disorders. Further, there is a need for detection of clinically significant validated apneic events, which is both more sensitive and more specific, than can be obtained using a conventional pulse oximeter. It would be desirable to provide a simple, efficient and inexpensive enhanced pulse oximetry system that better captures highly transient, but meaningful, desaturation events. Furthermore, there is a need for an enhanced pulse oximetry system that provides the result in real time mode as well as in non-real time, or batch mode for diagnosing and screening sleep related disorders.

SUMMARY

The following embodiments and aspects thereof are described and illustrated in conjunction with systems, tools and methods, which are meant to be exemplary and illustrative, and not limiting in scope. The present specification discloses numerous embodiments.

The present specification discloses a pulse oximetry system configured to detect a respiratory event, comprising: an acquisition unit for acquiring sleep test data comprising a set of unconditioned oximetry data and at least one other physiological sensor data; a storage unit for storing the sleep test data; a processor configured to receive and process the stored sleep test data, and associate a confidence score with each respiratory event of interest identified from the sleep test data; and an output unit configured to visually display processed sleep test data and the associated confidence score.

Optionally, the processor comprises: a first processing unit to correlate the set of oximetry data with the at least one other physiological sensor data and identify at least one respiratory event of interest; and a second processing unit to process each respiratory event of interest and associate the confidence score with each respiratory event of interest. Optionally, the confidence score is based on one or more of a number of the at least one other physiological sensor data, quality of the data from the at least one other physiological sensor, the correlation of the set of oximetry data with the at least one other physiological sensor data, duration of the respiratory event of interest, or a minimum desaturation level.

Optionally, the at least one other physiological sensor data comprises data generated by one or more of a nasal pressure sensor, a thermal sensor, a humidity sensor, a resistive sensor, an inductance plethysmograph, a polyvinylidene fluoride (PVDF) sensor, an accelerometer, an electroencephalogram, an eye movement sensor, a body position sensor, a motion sensor, a heart rate sensor, an audio sensor, or a video sensor.

Optionally, the processor is configured to detect short duration amplitude desaturation events and long duration desaturation events simultaneously. Optionally, the short duration amplitude event ranges from 2 to 10 seconds. Optionally, the amplitude desaturation event is in a range of 2% to 4%. Optionally, the unconditioned pulse oximetry data is sourced from a sensor comprising one of: an infrared sensor, an optical sensor, or a red light sensor.

Optionally, the unconditioned pulse oximetry data comprises digital samples of analog signals from one or more photodetectors.

Optionally, the output unit is configured to display a list of respiratory events of interest, each with at least one of desaturation level, duration, or a processed pulse oximetry signal.

The present specification also discloses a method of detecting sleep disordered breathing, comprising: acquiring sleep test data comprising unconditioned oximetry data and at least one other physiological sensor data; storing the acquired sleep test data; correlating the unconditioned oximetry data and the at least one other physiological sensor data; determining desaturation events from the correlating; associating a confidence score to each desaturation event; and visually displaying the desaturation events and the associated confidence scores.

Optionally, the confidence score is based on one or more of a number of the at least one other physiological sensor data, quality of the data from the at least one other physiological sensor, the correlation of the set of oximetry data with the at least one other physiological sensor data, duration of the respiratory event of interest, or a minimum desaturation level.

Optionally, the at least one other physiological sensor data comprises data from one or more of a nasal pressure sensor, a thermal sensor, a humidity sensor, a resistive sensor, an inductance plethysmograph, a polyvinylidene (PVDF) sensor, an accelerometer, an electroencephalogram, an eye movement sensor, a body position sensor, a motion sensor, a heart rate sensor, an audio sensor, or a video sensor.

Optionally, the determining comprises: in a time forward direction and at start of each desaturation event, using short term averaging to determine desaturation level and lowest saturation level measured; correlating a portion of data after desaturation which includes re-saturation with the unconditioned pulse oximetry data; correlating a data when the re-saturation is complete with the unconditioned pulse oximetry data; and in a time-reverse direction, calculating a slope of re-saturation. Optionally, the calculating the slope of re-saturation comprises identifying an interpolated portion of the desaturation event.

Optionally, the unconditioned pulse oximetry data comprises digital samples of analog signals from one or more photodetectors.

Optionally, the visually displaying comprises displaying a list of respiratory events of interest, each with at least one of desaturation level, duration, or a processed pulse oximetry signal.

Optionally, determining comprises detecting short duration amplitude desaturation events and long duration desaturation events simultaneously. Optionally, the short duration amplitude event ranges from 2 to 10 seconds. Optionally, the amplitude desaturation event is in a range of 2% to 4%.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
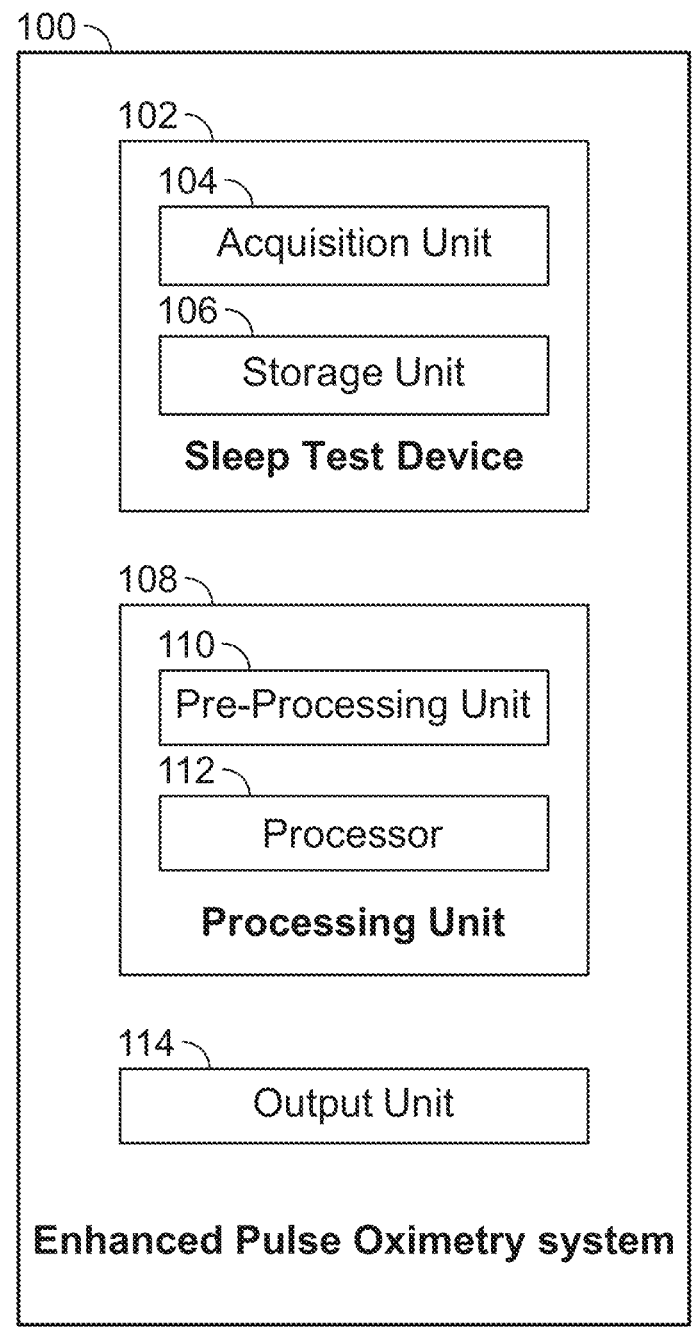
FIG. 1 is a block diagram showing components of an enhanced pulse oximetry system in accordance with one embodiment of the present specification.

The present specification describes an enhanced pulse oximetry system for diagnosing sleep disordered breathing. The enhanced pulse oximetry system includes a sleep test device for acquiring and processing signals that often get lost, dropped or averaged out in conventional systems.

Pulse oximetry data is inherently noisy (primarily due to motion), therefore, conventional systems distort desaturation events as part of noise reduction, which is acceptable for the purposes of some clinical environments. This means, conventional systems may eliminate or represent desaturations with reduced depth and duration. The desaturation event timing is also shown as delayed by a few seconds from actual timing. Since sleep apnea and hypopnea (and other respiratory disturbance events) are evaluated, in part, on levels of desaturation and duration of events, the reduction of noise in pulse oximetry signals in a way that minimizes distortion has the potential to improve specificity and sensitivity of clinical testing. In embodiments of the present specification, desaturation events, especially mild ones, are evaluated with greater confidence by correlating them in time to changes in other sensor data.

The sleep test device of the present specification includes an acquisition unit for acquiring a set of unprocessed oximetry data. Further, the sleep test device includes a storage unit for storing the set of unprocessed oximetry data. The enhanced pulse oximetry system of the present specification may further include a pre-processing unit for identifying potential desaturation events which are candidates for enhanced processing. In embodiments, the pre-processing unit outputs a list of respiratory events of interest which, are identified using contextual information from other physiological sensors and unconditioned pulse oximetry data.

The enhanced pulse oximetry system comprises a processor configured to receive from the pre-processing unit, the correlated set of sleep test data. The processor associated with the enhanced pulse oximetry system is adapted to execute one or more software programs that processes the sleep test data to generate an enhanced and accurate result.

The enhanced pulse oximetry system includes an output unit for providing the enhanced and accurate result generated by the processing unit to a clinician. The outputs include waveforms of respiratory events of interest, individually and in various superimposed or sequential groups; histograms of the respiratory event parameters; and/or results of calculations derived from the events. Furthermore, the clinician reviews the enhanced and accurate results in different review modes. In addition, the clinician customizes the one or more different review modes using a confidence score of individual events.

A primary objective of the present specification is to provide an enhanced pulse oximetry system that monitors sleep disorder breathing that is often undetected due to the transient nature of the corresponding desaturation event. Another objective of the present specification is to provide an enhanced pulse oximetry system that processes the unprocessed oximetry data to provide more precise and accurate results. Yet another objective of the present specification is to provide an enhanced pulse oximetry system that provides more sophisticated interpretation of the unprocessed signals, in conjunction with other monitored physiological signals, audio, video and other environmental data, to provide clinicians with a more accurate and more nuanced picture of a patient's breathing and the various physiological systems associated with Respiratory Disturbance Events (RDE).

In a preferred embodiment of the present specification, the enhanced pulse oximetry system diagnoses sleep disordered breathing and respiratory disturbance related disorders more precisely and accurately. In an alternative embodiment of the present specification, the enhanced pulse oximetry system processes a set of unprocessed data in format of batch signal processing. In one embodiment of the present invention, the advanced pulse oximetry system utilizes concurrent monitoring of one or more physiological events to improve analyzing of the set of unprocessed pulse oximetry data in near real time.

In one embodiment of the present specification, the enhanced pulse oximetry system is capable of recording short duration respiratory disturbance events and diagnosing sleep disordered breathing during one or more desaturation conditions. The one or more desaturation conditions are recorded during polysomnography, home sleep apnea test, sleep oximetry, pulse oximetry, electroencephalogram.

In another embodiment of the present specification, the enhanced pulse oximetry system identifies respiratory disturbance events with high sensitivity and specificity. In another embodiment of the present invention, enhanced pulse oximetry system detects short duration or small duration desaturation event and long duration desaturation events simultaneously. In another embodiment of the present invention, the enhanced pulse oximetry system eliminates time averaging signal processing and noise reduction techniques designed for other clinical settings. In another embodiment of the present invention, the enhanced pulse oximetry system utilizes one or more transmitters, one or more photo detectors, a signal processing unit and one or more analog to digital converters.

In embodiments of the present specification, the method for diagnosing sleep disordered breathing includes a series of steps to be performed for diagnosing sleep related breathing disorders. First, a set of unprocessed pulse oximetry data is acquired using a signal acquisition device of a sleep test device that records oximetry pulse signals. Further, the method may include a step of sampling the set of unprocessed pulse oximetry data at far higher rates than conventional systems. In embodiments, the unprocessed data is stored in a storage unit of the sleep test device. Second, the set of unprocessed pulse oximetry data is uploaded to a computer system by the sleep test device. The method includes a step of processing the set of unprocessed pulse oximetry data using one or more computer software to generate enhanced and accurate results. In addition, the method further includes a step to present the enhanced and accurate results to a clinician. The method further includes a step to select a new mode for reviewing the enhanced and accurate results that is presented to the clinician and receiving a decision from the clinician related to sleep disorder breathing based on the enhanced and accurate results.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

The systems described in the present specification may comprise at least one processor to control the operation of the entire system and its components. It should further be appreciated that the at least one processor is capable of executing programmatic instructions, has a memory capable of storing programmatic instructions, and employs software comprised of a plurality of programmatic instructions for performing the processes described herein. In one embodiment, the at least one processor is a computing device capable of receiving, executing, and transmitting a plurality of programmatic instructions stored on a volatile or non-volatile computer readable medium. In embodiments, the systems described in the present specification are coupled to at least one display, which displays information about the patient parameters and the functioning of the system, by means of a GUI. The GUI also presents various menus that allow users to configure settings according to their requirements.

It should further be appreciated that each device and monitoring system employed in the present specification may have wireless and wired receivers and transmitters capable of sending and transmitting data, at least one processor capable of processing programmatic instructions, at least one memory capable of storing programmatic instructions, and software comprised of a plurality of programmatic instructions for performing the processes described herein.

In the following description the following terms may be used without limitation:

The terms "apnea", "apneic", "apneas", represent a cessation of breathing for at least 10 seconds while sleeping.

"Hypopnea" shall mean a significant reduction in airflow for at least 10 seconds while sleeping that causes a drop in blood oxygen saturation and/or an arousal.

The term "Respiratory Effort Related Arousal" (RERA) shall mean an arousal or desaturation without qualifying as apnea or hypopnea. The number of RERAs may represent an indicator of disease severity.

The term "arousal" shall mean a shift in the patient's electroencephalogram (EEG) to a faster frequency, such as from theta waves, which is in the range of 5 to 8 Hz, to alpha waves which is in the range of 8-12 Hz. An EEG measures a patient's brain-based electrical activity using electrodes.

The term "Respiratory Distress Index" (RDI) shall mean the combined number of apneas, hypopneas and RERAs per hour.

The term "Apnea Hypopnea Index" (AHI) shall mean the number of combined apneas and hypopneas per hour and shall be defined as normal when the index is less than 5 per hour; mild when the index is between 5 and 14 per hour; moderate when the index is between 15 and 29 per hour; and severe when the index is 30 or more per hour.

The term "Oxygen Saturation" shall mean the fraction of oxygen saturated hemoglobin relative to total hemoglobin (95-100% is normal).

The term "Desaturation" shall mean a drop in oxygen saturation relative to baseline.

The term "Oxygen Desaturation Index" (ODI) shall mean the number of times per hour the blood oxygen level drops below a certain degree from baseline.

The term "perfusion" shall mean the rate of passage of blood through tissue.

The term "Sleep Disordered Breathing" (SDB) shall mean a group of physio-pathologic conditions characterized by abnormal respiratory patterns during sleep that can be isolated or coexist with other respiratory, nervous, cardiovascular or endocrine diseases. Sleep apnea and its subtypes are examples of conditions within this group.

The term "Polysomnography" (PSG) shall mean an in-laboratory attended diagnostic sleep test for sleep-related breathing disorders. Accordingly, a patient sleeps while connected to a variety of monitoring devices that record physiologic variables.

The term "Home Sleep Apnea Test" (HSAT) or "Home Sleep Test" (HST) shall mean a medical test in which a portable monitoring device is worn by the patient at home during sleep to record data related primarily to breathing to aid in diagnosing sleep disordered breathing. At a minimum, typically, breathing effort, nasal pressure and oxygen saturation are monitored and recorded.

The term "Sleep Oximetry" or "Overnight Oximetry" shall mean a medical test where a portable monitoring device worn by the patient records oxygen saturation levels to aid in the diagnosis of sleep disordered breathing. This is typically an overnight test to record pulse oximetry data while the patient is sleeping.

The term "Pulse Oximetry" shall mean a test to measure the oxygen level (oxygen saturation) of the blood. Conventionally, this includes a non-invasive probe device placed on a body part such as a finger, toe, ear lobe or forehead. Small beams of light pass through the tissue and changes in light absorption are measured to determine the amount of oxygenated vs deoxygenated blood. The ratio of oxygenated vs deoxygenated blood is typically represented as a percentage. Pulse rate (expressed in beats per minute) may also be obtained from this test.

The term "EEG" or "Electroencephalogram" refers to measurement of brain based electrical activity using electrodes.

As used herein, "unconditioned" pulse oximetry values refer to stored digital samples of analog signals from photodetectors and do not include additional analyzing, normalization, or other functions.

In accordance with the present specification, the disadvantages and limitations of the prior art are avoided by providing an enhanced pulse oximetry system for diagnosing sleeping associated breathing disorders. The enhanced pulse oximetry system is a medical monitoring device that is used by clinicians, physicians, and/or health workers to diagnose respiratory disturbance events during sleep cycles. In addition, the enhanced pulse oximetry system may be used to monitor a patient during transport, perform respiratory monitoring during narcotic administration, and evaluate the efficacy of home-oxygen therapy. In another embodiment, the pulse oximetry device provided in present specification may be used at a variety of locations, such as a medical facility, a home, a workplace, a school, among other types of locations.

In conventional pulse oximeters, blood flow and chest excursion measurements precede reported SpO2 measurements that introduce a 20-second delay to stabilize the readings. The present specification provides embodiments that detect respiratory disturbance events by measurement of changes in blood oxygenation (SpO2), blood flow, and chest excursion. Therefore, embodiments of the present specification can detect sleep disruption and subsequent arousal with its co-morbidities which can occur prior to SpO2 changes that are large enough to be detected by conventional pulse oximeters.

In the present specification, instantaneous unconditioned pulse oximetry values are saved and subsequently analyzed, rather than using filtered and averaged SpO2 measurements. As used herein, unconditioned pulse oximetry values refers to stored digital samples of analog signals from photodetectors. The unconditioned pulse oximetry values do not include additional analyzing, normalization, or other functions. In one implementation, the measured pulse oximeter values are evaluated for desaturation while breathing metrics are optionally analyzed for cessation of breathing, and a sensitive threshold is used to trigger identification of a potential apneic event. In embodiments, pulse oximeter values are correlated with at least one of the following: respiration effort measured using a belt sensor around the chest or abdomen to detect movement; nasal pressure; thermistor; brain waves; eye movement; heart rate; breathing pattern; body position; limb movement; sounds using a microphone; a motion sensor, and any other audio or visual input. The greater number of values used for correlation indicate a higher confidence level in the analysis. The trigger starts an adaptive post hoc analysis.

In one embodiment, the system correlates SpO2 levels, chest metrics, blood flow metrics (if available), and movement artifact, to compute the rate of desaturation and recovery. In embodiments, at least respiration effort data and nasal pressure data is recorded and analyzed along with the pulse oximeter data. The system then interpolates the start and end of desaturation and uses the data to compute the maximum desaturation level and the duration of the apneic event. In embodiments, the systems and methods of the present specification produce SpO2 values synchronous with other metrics, thus providing faster and more accurate measurements of desaturation. Also, the onset and recovery of desaturation are tightly correlated to the onset and recovery of an apneic event. In the present specification, detection of clinically significant validated apneic events is both more sensitive and more specific than can be obtained using a conventional pulse oximeter.

In an embodiment, the present specification does not filter, decimate, average, and/or reduce artifacts in real time or near real time, like conventional pulse oximeters do, to output a heart rate or oxygen saturation. The conventional approach stabilizes the data display but fails to track rapid but real changes in $SpO_2$. Data relevant to a sleep disordered breathing diagnosis is lost in this processing. As there is no need of real time reporting of this data in sleep testing, more sophisticated interpretation of these signals can be performed, in conjunction with other monitored physiological signals, audio, video and other environmental data, to provide clinicians with a more accurate and more nuanced picture of a patient's breathing and the various physiological systems associated with respiration.

In an embodiment, the present specification enables a clinician, upon a retrospective review of a study, to identify respiratory disturbance events of potential interest with higher sensitivity and specificity. The enhanced pulse oximetry system is specifically utilized to process multiple unprocessed and stored signals. The enhanced pulse oximetry system may be used by a clinician to detect multiple desaturation events that are indicative of one or more of apnea, hypopnea, respiratory effort related arousal, a reading on the respiratory distress index, a reading on the apnea hypopnea index, a reading on the oxygen desaturation index, a degree of perfusion, sleep disordered breathing, sleep apnea and its subtypes, and/or PSG sleep-related breathing disorders.

FIG. 1 illustrates an enhanced pulse oximetry system in accordance with some embodiments of the present specification. The enhanced pulse oximetry system 100 comprises a sleep test device 102 for acquiring and storing a set of unprocessed and unconditioned data. The sleep test device 102 further includes an acquisition unit 104 that is configured to acquire the set of unprocessed and unconditioned oximetry data in addition to other physiological metrics with use of multiple sensors. Various sensors are included in acquisition unit 104 and may include, but are not limited to snore microphones, thermal and flow sensors, chest and abdomen excursion sensors, accelerometer, EEG sensor, electromyograph (EMG) sensor, electrocardiograph (ECG) sensor, limb movement sensor, video sensors, and/or audio sensors. The pulse oximetry sensor may be at least one of an infrared sensor, an optical sensor, a red light sensor and any other oximetry sensor known in the art. Other physiological metrics acquired by unit 104 include, in embodiments, measurements from one or more respiratory sensors. Further, the sleep test device 102 comprises a storage unit 106. The storage unit 106 stores the set of unconditioned oximetry data and may also store other physiological data, which enables the enhanced pulse oximetry system 100 to be used in different environments.

In an embodiment, the present specification discloses a HSAT/HST (home sleep apnea test), or similar environment, where the entire study is completed, the data is later uploaded by a clinician, and then processed as a batch (not real time). Other embodiments include environments using polysomnography (PSG) in a laboratory setting or other cases where data is viewed in near-real time. In some environments, the system described could work with a short (potentially a 30 second minimum) time delay and process data in accordance with the embodiments described in the present specification. In some embodiments, the enhanced pulse oximetry data is processed and displayed in synchronization with data from the other physiologic sensors, appearing as a time-delay to a clinician monitoring an ongoing PSG.

The enhanced pulse oximetry system 100 comprises a processing unit 108. The processing unit 108 receives the set of unconditioned oximetry data from the sleep test device 102. The processing unit 108 processes the set of unconditioned data and concurrently monitors the set of unconditioned oximetry data. The processing unit 108 associated with the enhanced pulse oximetry system may be in the form of a laptop, desktop, mobile phone or any other computing device comprising a processor in data communication with a non-transient memory and configured to execute a plurality of programmatic instructions stored in the non-transient memory.

The processing unit 108 further comprises a respiratory event identification unit 110, also referred herein as a pre-processing unit 110. Pre-processing unit 110 is configured to identify respiratory events of interest, such as desaturation events. The respiratory events of interest are identified by using data acquired from breathing related sensors such as a nasal pressure sensor, an abdomen/chest wall motion sensor, a thermistor, a humidity sensor, a resistive sensor, an inductance plethysmograph, or a polyvinylidene fluoride (PVDF) sensor. The respiratory events of interest may include breathing cessation, partially obstructed breathing, change in breathing rate, shallow breathing followed by arousal and/or gasping. Data from other sensors may include but are not limited to accelerometers/motion sensors, body position sensors, audio sensors, video sensors, EEG, eye movement (EOG), heart rate and/or ECG.

In addition, the processing unit 108 comprises processor 112. Processor 112 uses the data from unit 110 to adjust responsiveness to changes, which may be small changes in either amplitude or duration. In embodiments, as described below, the duration may be in a range of 2 to 10 seconds and the amplitude may be in a range of 2 to 4 percent. In embodiments, processor 112 calculates slope of each desaturation event, reconstructs the corresponding re-saturation slope, and associates a confidence score with each desaturation event. An exemplary process executed by processor 112 is described subsequently with reference to FIG. 5. In some embodiments, unit 110 pre-processes the set of unconditioned oximetry data to generate a set of data for analysis by processor 112 (enhanced processing). Additionally, unit 110 concurrently monitors multiple physiological or respiratory events to improve analysis of the unconditioned pulse oximetry data.

Processor 112 is configured with one or more software programs. In addition, processor 112 processes the data from unit 110 using the one or more software programs to generate an enhanced and accurate result. A confidence score is also associated with each respiratory event of interest. In some embodiments, a confidence score is assigned based on the contextual information provided by other sensors and/or the number of sensors corroborating an event of interest. In one example, if an accelerometer shows movement, a low confidence score is assigned. In another example, if an RIP belt and nasal pressure sensor indicate slowed or stopped respiration, a high confidence score is assigned. In addition to the number of sensors corroborating the event of interest, the confidence score is assigned based on quality of sensor data, correlation of calculated desaturation to interpolated re-saturation, duration, and minimum desaturation level. A combination of sensors which corroborate an event of interest would result in an increase in the confidence score. In an example, confidence increases for a respiratory event if nasal pressure drops, an RIP belt stops motion, a thermistor temperature drops, microphone breathing sounds cease, and $SpO_2$ saturation is measured as dropping. Further, if the recovery portion of the event is also corroborated the confidence score increases. In another example, the confidence score increases for a recovery event if a microphone detects gasping, an accelerometer shows movement, RIP belt motion starts, a nasal pressure increases, and an increase in $SpO_2$ saturation is detected.

In some embodiments, individual sensors are weighted. In one embodiment, RIP belt motion and nasal pressure sensor data is given more weight over data from a microphone. In some embodiments, a sensor is "discredited", or its data is weighted less, if the data coming from it appears compromised due to a loosening, improper positioning, or malfunction of the sensor. In one example, data from a nasal pressure sensor is discredited if a nasal cannula is no longer positioned at the nostrils. Other factors include the consistent decline of $SpO_2$ saturation and whether the interpolated re-saturation trend line intersects at the expected point with the desaturation trend line. The one or more software programs may be configured based on C, C++, Java, Python, Android, Swift, Machine Learning, Artificial Intelligence, Deep Learning, Neural Networks, and the other programs that are capable of performing the functions required as described in the present specification.

Furthermore, the enhanced pulse oximetry system 100 comprises an output unit 114. The output unit 114 is configured to provide an enhanced and accurate result derived from processing unit 108, to the clinician. The results relate to one or more respiratory events. The output of the analysis may include a list of events, each with at least one of confidence scores, desaturation levels, duration, and a processed pulse oximetry signal with enhanced processing. This data can be displayed as various graphs and statistics for clinical review. In one embodiment, system 100 automatically selects one or more of the presentations illustrated in FIG. 7 for viewing by the clinician. The clinician can view the one or more metrics concurrently, can change the inclusion parameters and the detailed views, and observe the results of these changes dynamically. The clinician may be a doctor, a nurse, a medical practitioner or any other caregiver. The output unit 114 may comprise a monitor, laptop screen, mobile phone screen or any other display device. In some embodiments, the output unit 114 is a wrist worn device that assists with the monitoring of pulse oximetry data. The wrist worn device may be a smart watch, smart band or any other wearable embodiment. Output unit 114 is configured as a monitoring device that displays the result on a display associated with the monitoring device.

The enhanced pulse oximetry system 100 additionally includes components such as, but not limited to: at least one transistor, at least one photodetector, at least one signal processing unit and at least one analog-to-digital converter. In one embodiment, light intensity and amplifier gains are adjusted in the enhanced pulse oximetry system 100 to keep the processed signals within a dynamic range of the analog-to-digital converters, thus conserving battery life.

Figure 2:
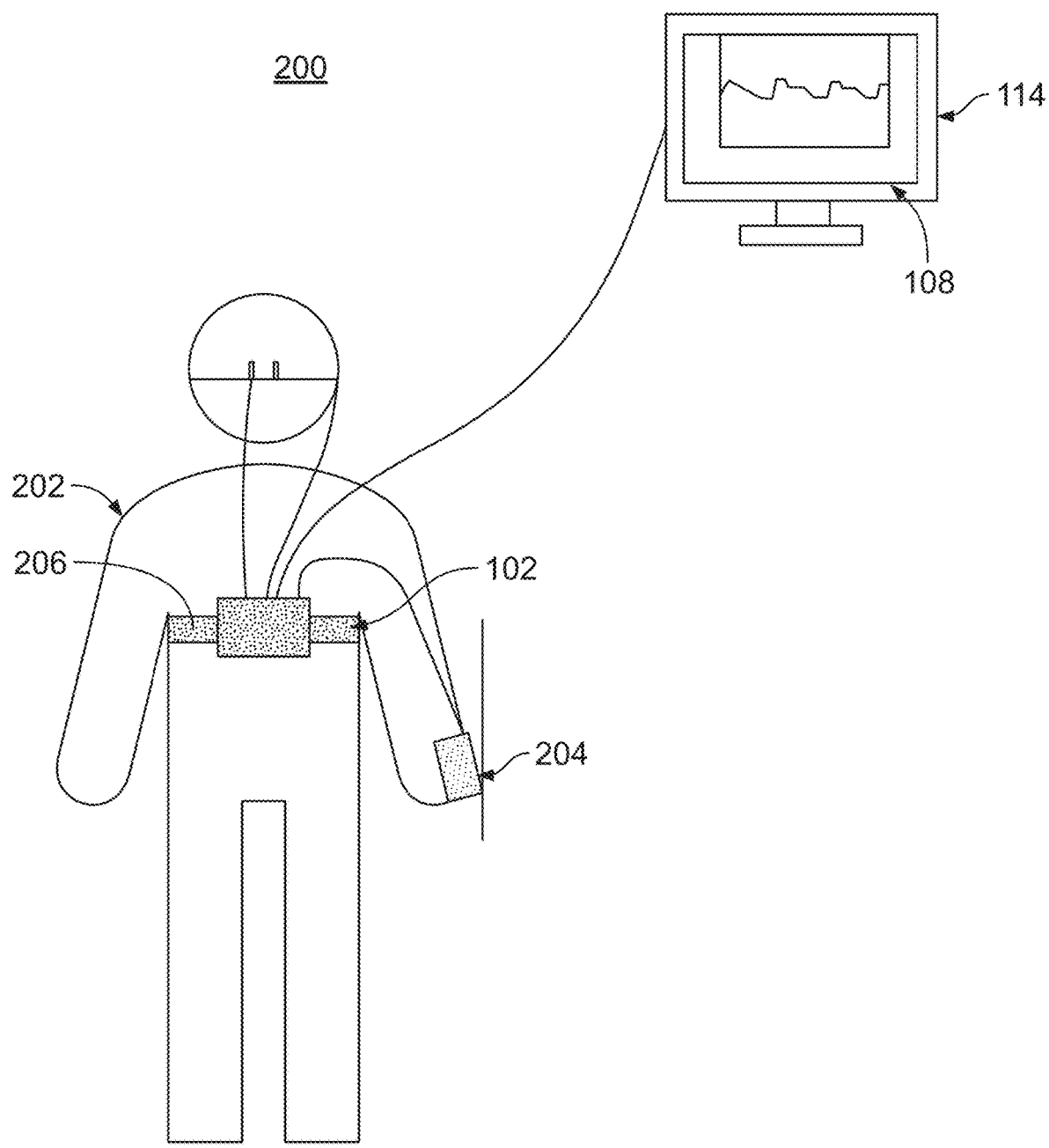
FIG. 2 is an illustration of an enhanced pulse oximetry system attached to a patient in accordance with one embodiment of the present specification.

FIG. 2 illustrates an enhanced pulse oximetry system 200 attached to a patient in accordance with one embodiment of the present specification. In an embodiment, the enhanced pulse oximetry system 200 can be used in one or more of different types of locations, such as a hospital, home, office, school, or any other location. In an embodiment, the patient 202 under monitoring is stationary and in a restful position. In some embodiments, the patient 202 is supine. The clinician may attach a pulse oximeter sensor 204 by, for example, placing a finger of the patient into a receiving portion of the sensor 204. The sleep test device 108 may be attached to a respiratory belt 206 or placed at any other location, and includes acquisition unit 104 which further includes or is connected to multiple sensors, such as pulse oximeter 204 and respiratory belt 206, that record various signals. The signals are a set of unprocessed analog oximetry data and may include other physiological data like nasal pressure, thoracic activity, thermistor data, snore microphone data, video data, and/or audio data.

The sleep test device 102 attached to the patient acquires a set of unconditioned oximetry data and additional respiratory metrics. Storage unit 106 of sleep test device 102 stores the data. The stored data is communicated to the processing unit 108. Communication is performed with a wired or a wireless connection. In some embodiments, sleep test device 102 is connected to processing unit 108 using an optical fiber cable, a twisted pair cable, a coaxial cable, or some other type of wired connection. In some embodiments, wireless connections such as but not limited to Bluetooth, infrared, and Wi-Fi, are used to enable communication between sleep test device 102 and processing unit 108. The processing unit 108 includes a pre-processing unit 110. Unit 110 receives the set of unconditioned oximetry data and correlates it with data from other physiological sensors. In some embodiments, the pre-processed data is generated continuously or in near real-time. In some embodiments, the pre-processed data is generated in batches. The pre-processed data is further processed by processor 112. Processor 112 also assigns confidence levels or scores to each respiratory event of interest. Processed data is displayed using output unit 114. In embodiments, processor 112 is configured to generate alarms and/or notification through output unit 114, in case of respiratory events of interest that may involve one or more desaturation events.

The results processed by processor 112 are viewed by a user (patient, clinician, physician, or any other caretaker) using one of different types of review modes. Programs implemented by processor 112 apply various signal processing algorithms to provide the multiple modes of review to the user. For example, the modes of review offered could focus on quickly identifying events of potential interest to providing higher sensitivity to subtle changes in oxygen desaturation. In some embodiments, the clinician can select a confidence threshold for which events are displayed.

Figure 3A:
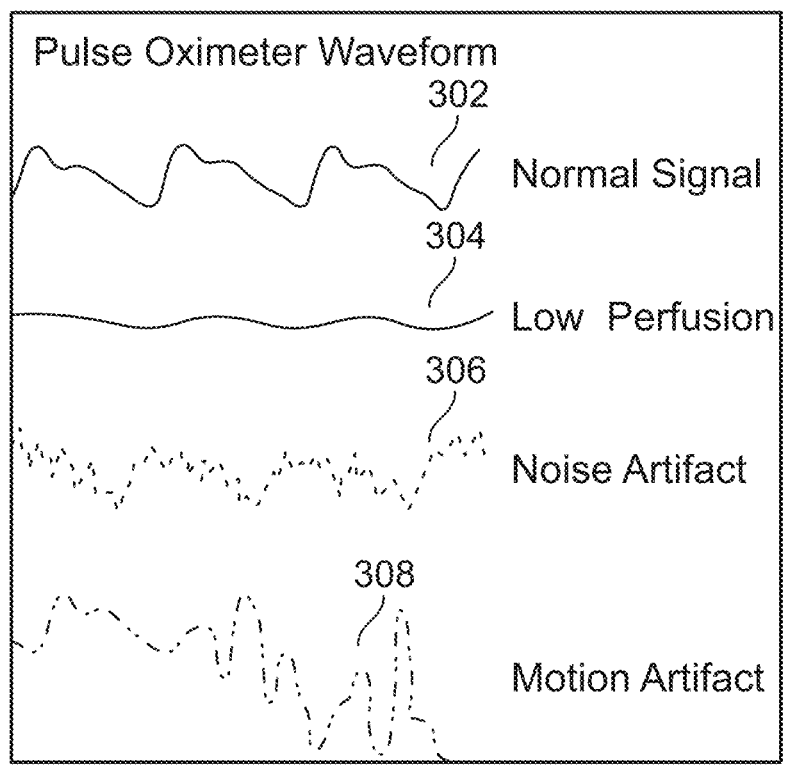
FIG. 3A show exemplary graphs that may be captured and displayed by a pulse oximetry system.

FIG. 3A illustrates exemplary graphs that may be captured and displayed by a pulse oximetry system. Accordingly, a graph 302 illustrates a normal waveform, conveying no special event or disturbance in blood plethysmography activity. A graph 304 illustrates low perfusion activity detected by the pulse oximetry system. A graph 306 illustrates detection of a noise artifact, and a graph 308 illustrates detection of a motion artifact. The signals represent, in the generated graphs as illustrated, but not drawn to scale, a direct trending of unconditioned red and IR signals (referred to as photoplethysmography or PPG) that is used to calculate the derived SpO2 and heart rate outputs. The inherent low Signal to Noise Ratio of PPG signals requires noise management techniques such as averaging and filtering. Motion artifacts are typical causes of pulse oximeter failure and loss of accuracy in measurements and is managed in conventional systems by detecting motion and stopping acquisition until it resolves. Noise and motion artifacts are managed during the calculation of SpO2. Embodiments of the present specification reduce interference introduced by the noise and motion artifacts using adaptive filters and short segment analysis to provide signals with improved accuracy. Embodiments of the present specification add information from additional data sources in addition to historical values from the pulse oximeter to the feedback loop in order to determine weighting values used in the adaptive processing.

Figure 3B:
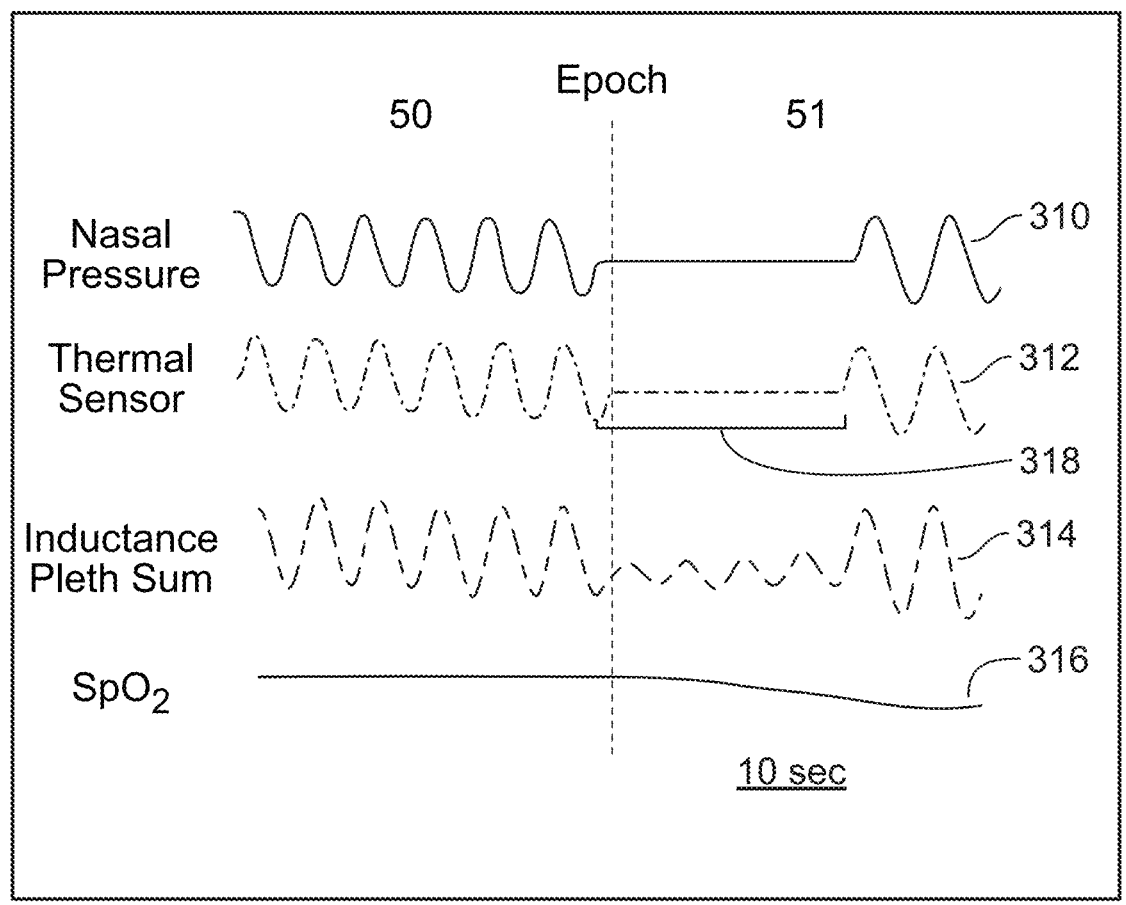
FIG. 3B show exemplary graphs that may be captured by different types of sensors during a desaturation event, in accordance with some embodiments of the present specification.

FIG. 3B illustrates exemplary graphs that may be captured by different types of sensors during an apnea event, in accordance with some embodiments of the present specification. Patients with sleep apnea and some other sleep disorders are likely to stop breathing during sleep. The resulting drop in oxygen levels in the blood, known as desaturation, disrupts sleep and eventually arouses the patient (called an arousal event) to start breathing again. Embodiments of the present specification use signals or data sources from additional sensors/monitors, to enhance the data sources by a pulse oximeter. Accordingly, a graph 310 represents the signal captured by a nasal pressure sensor, a graph 312 represents the signal captured by a thermal sensor, a graph 314 represents an inductance plethysmography signal, and a graph 316 represents an oxygen saturation measurement recorded by a pulse oximeter. Oxygen is measured as $SpO_2$ which is the percentage of oxygen saturation of hemoglobin. Various sensors are included in acquisition unit 104 of sleep test device 102 of the present specification, which may include, but are not limited to snore microphones, thermal and flow sensors, chest and abdomen excursion sensors, accelerometer, video sensors, and/or audio sensors. A snore microphone and nasal pressure acquiring sensor monitors the nasal pressure and the snoring frequency. An inductance plethysmograph may continuously sense respiratory movements of the chest and the abdomen of the patient. A thermal sensor monitors the temperature changes in airflow of the inhaled and exhaled air. A period 318 starting from a dotted vertical line, marks the beginning of an apnea event. In the illustration, period 318 is of approximately 10 seconds. During period 318, graphs 310, 314, and 316 display corresponding changes representing changes in activities (signals) monitored by the sensors. Frequent desaturation events result in diminished sleep quality, daytime drowsiness, attention and memory retention issues, and long term cardiac and other systemic problems. Diagnostic sleep study performed by embodiments of the present specification uses pulse oximetry to continuously record the oxygen level in the blood, as well as respiratory movements of the chest and abdomen, air flow through the nose and mouth, and other metrics. Pulse oximetry data, such as that shown in FIG. 3A, is preprocessed (unit 110 of FIG. 1) to identify respiratory events by correlating unconditioned pulse oximeter data with data from other sleep sensors shown in FIG. 3B. Subsequently, the pulse oximetry data is processed and associated with a confidence score.

Figure 4A:
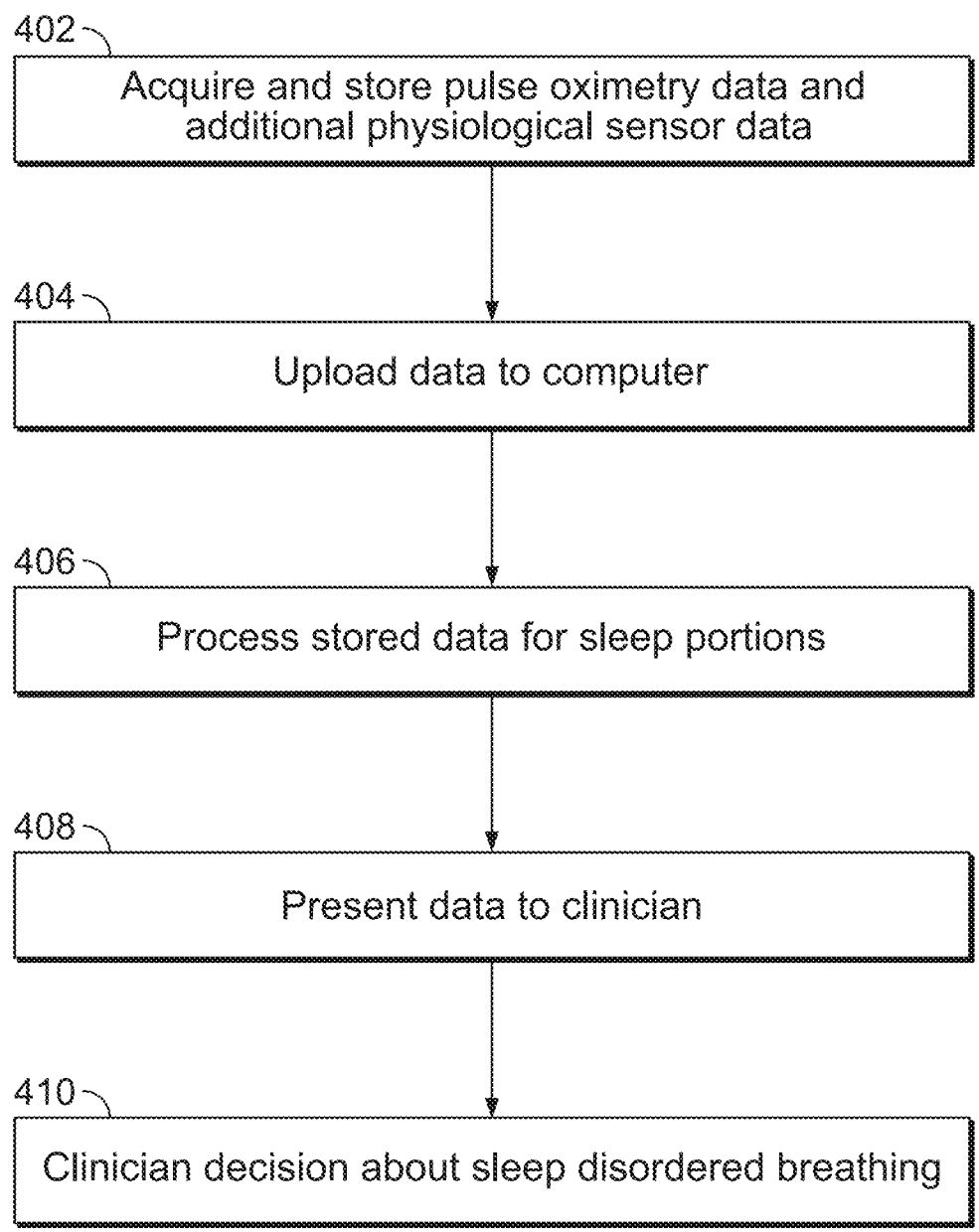
FIG. 4A is a flowchart illustrating an exemplary method of diagnosing sleep associated breathing disorders by using the enhanced pulse oximetry system, in accordance with some embodiments of the present specification.

FIG. 4A illustrates an exemplary method of diagnosing sleep associated breathing disorders by using the enhanced pulse oximetry system, in accordance with some embodiments of the present specification. At step 402, sleep test device 102 acquires the set of unprocessed pulse oximetry data using acquisition unit 104. The data may include data from a pulse oximeter 204 in addition to one or more of sensors in (that form a part of) acquisition unit 104, such as and not limited to nasal pressure data, inductance plethysmograph data, thermistor data, accelerometer data, among other types of sensor data. The acquired data may be termed as 'sleep test data'. At step 404, the sleep test device 102 stores the unprocessed sleep test data acquired at step 402, to a storage unit 106. Data storage prior to signal processing enables more sophisticated and customizable signal processing methods that can be applied to reveal subtle manifestations of milder sleep disordered breathing which often go undiagnosed. At step 406, processing unit 108 processes acquired sleep test data to generate an enhanced and accurate set of results. The variety of physiological data made available from the multiple sensors, in addition to the pulse oximetry data, improves data analyzing and signal processing. A set of programs, herein termed as the sleep test review software for detection of sleep associated breathing disorders, are configured in processing unit 108. Exemplary processing steps executed by processing unit 108 are described further with reference to FIG. 4B.

Figure 4B:
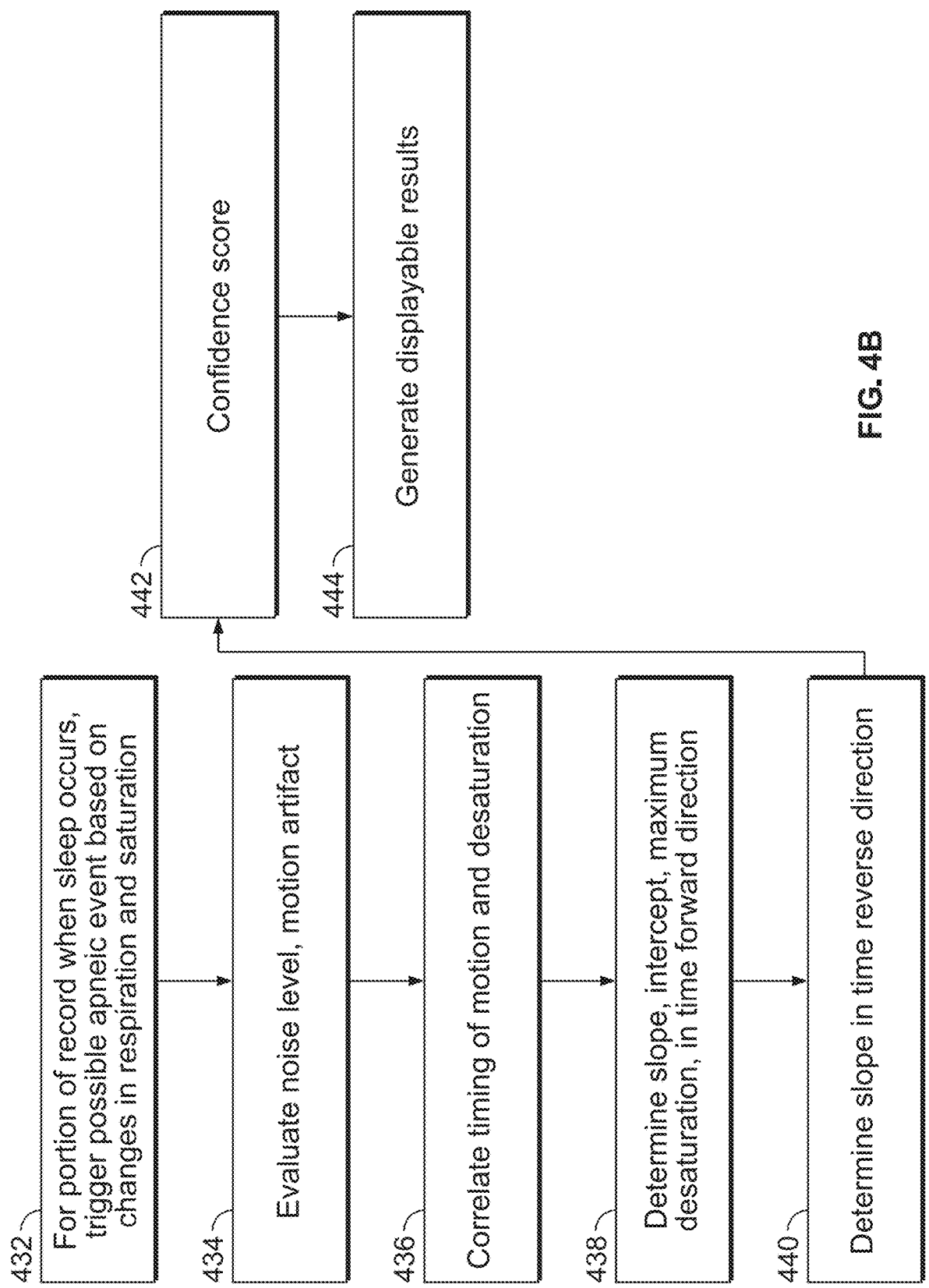
FIG. 4B is a flowchart illustrating an exemplary process of using unconditioned pulse oximetry data and additional physiological sensor metrics to identify respiratory events and assign a confidence score to each event, in accordance with some embodiments of the present specification.

FIG. 4B is a flow chart illustrating an exemplary process of using unconditioned pulse oximetry data and additional physiological sensor metrics to identify respiratory events and assign a confidence score to each event, in accordance with some embodiments of the present specification. The method is implemented for the stored data that corresponds to the duration when a monitored patient is asleep.

Figure 5:
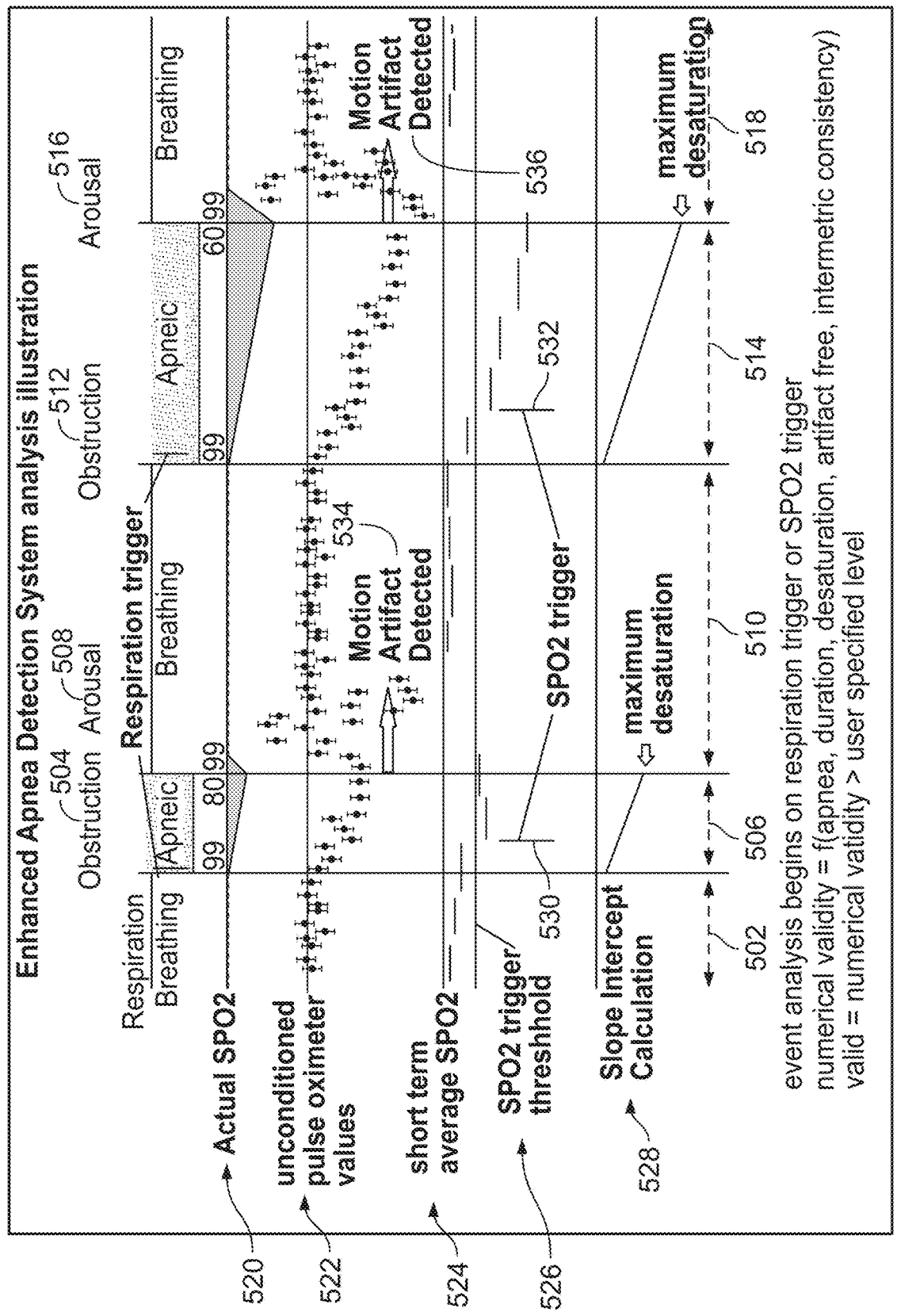
FIG. 5 illustrates exemplary aspects of an analysis process implemented in accordance with embodiments of the present specification.

FIG. 5 illustrates the processing of an exemplary set of data according to the process of FIG. 4B. Referring to FIG. 5, multiple graphical data are divided over a period under different types of respiration events. A first column 502 lists the name of signals that are received and/or calculated by the processing unit 108. The remaining columns are identified based on the type of respiration or breathing simulated herein for the purpose of illustrating process of analysis performed by processing unit 108 in accordance with the present specification. A second column identifies a first obstruction 504 in the respiration, which is marked by the onset of a first respiration event 506. First respiration event 506 ends with first arousal 508 followed by resuming of breathing 510. Then, a second obstruction 512 leads to a second respiration event 514, which is of slightly longer duration than the first apneic event 506. Second respiration event 514 ends with a second arousal 516 followed by restoration of breathing 518. Actual SpO2 values used to generate the simulated data in FIG. 5 to illustrate the process of FIG. 4B is shown in a first row 520. The unconditioned SpO2 data received from sleep test device 102 is graphically illustrated in a second row 522. The unconditioned SpO2 data of row 522 is a digital representation of the analog SpO2 signal measured by the system.

Referring simultaneously to FIGS. 4B and 5, at step 432, a trigger is noted for a potential respiration event based on changes in both respiration and desaturation. Changes in respiration are identified from changes in physiological sensors metrics, and changes in oxygen saturation are identified from pulse oximeter data. The trigger is identified by correlating data from the pulse oximeter and one or more additional physiological sensors. The additional sensors may include breathing related sensors (nasal pressure, abdomen/chest wall motion sensor, thermistor) to identify potential events of interest related to desaturation. Examples of events of interest include breathing cessation, partially obstructed breathing, change in breathing rate, shallow breathing, followed by arousal and/or gasping. Data from other sensors may include but are not limited to data from motion sensors, body position sensors, audio sensors, video sensors, EEG, eye movement (EOG) sensors, heart rate monitors and/or ECG. These changes are marked as onset of first obstruction 504, first arousal 508, second obstruction 512, and second arousal 516. During normal breathing, actual SpO2 520 is maintained at 99% level, which dips consistently to a level of 80% during first respiration event 506. After a small window, the level returns back to 99% till second obstruction 512 again steadily declines the SpO2 to approximately 60% before the second arousal 516 sets in. A third row 524 is a graphical representation of short term averaged SpO2 values derived from unconditioned SpO2 values of second row 522. Short term averaging is used to determine the slope of desaturation and lowest saturation levels measured. A line 524 shows an SpO2 trigger threshold. Respiration event triggers resulting from SpO2 data are introduced at a point 530 during first respiration event 506 and at a point 532 during second respiration event 514, when the short term averaged SpO2 value 524 crosses below threshold value represented by line 526.

At step 434, noise levels and motion artifacts are evaluated from the data. FIG. 5 shows detection of a first motion artifact 534 for a portion of the duration of breathing 510, and a second motion artifact 536 during breathing 518. At step 436, timing data from an accelerometer indicating motion and that from pulse oximeter relating to oxygen desaturation is correlated. Short term averaged SpO2 values 524 during 534 and 536 of the detected motion artifacts, are removed. At step 438, slope, intercept, maximum desaturation, and rate of desaturation, among other parameters, are determined. A fourth row 528 shows a graphical representation of the slope intercept calculation during first respiration event 506 and second respiration event 514. Maximum desaturation levels are identified from slope intercept calculation at points where arousal 508 and 516 kick in, which are also the points of re-saturation. Re-saturation portion of the event, seen from a 80% to 99% during breathing 510, and from 60% to 99% during breathing 518, which involves arousal and gasping, is correlated to unconditioned pulse oximetry data 522. Further completion of re-saturation events when the oxygen saturation levels stabilize and return to their previous normal values, is also correlated to unconditioned pulse oximetry data 522. These correlations are achieved in the form of slopes in a time-forward direction starting just before or at the onset of each respiration event 506 and 514.

At step 440, in a time reverse direction, the slope of re-saturation is calculated. Re-saturation portion of the event, seen from a 99% to 80% during breathing 510, and from 99% to 60% during breathing 518, which is from the resumed normal level of saturation to lowest desaturation level prior to re-saturation, is used to calculate the slope. Upon arousal and gasping, the unconditioned pulse oximetry data has a large amount of motion artifact, therefore, the calculated slope represents the interpolated portion of the event of interest.

At step 442, a confidence score is associated with the identified event of interest. A score is calculated for the pulse oximetry data of the respiratory event of interest based on the contextual information provided by other physiological sensors. In one example, if data from the accelerometer shows movement, the potential respiration event is associated with a low score; data indicating slowed or stopped respiration determined from RIP belt and nasal pressure sensors is associated with a high score, and other types of data is associated with a typical score. In some embodiments, a typical score is considered equivalent to data assessed by a conventional pulse oximeter. The score is determined as a function of apnea/hypopnea/RERA/any other sleep related breathing disorder determined from respiration event triggers (first obstruction 504 and second obstruction 512), duration of the respiration events, desaturation levels, artifact free data, and intermetric consistency. Additionally, the confidence score is based on number of sensors corroborating the event of interest, quality of sensor data, correlation of calculated desaturation to interpolated re-saturation, duration of the event of interest, and minimum desaturation level.

A range of high score values are associated with a high confidence level or a high confidence score. A range of low score values are associated with a low confidence level or a low confidence score. The remaining score values, in a medium range, are associated with a medium or a typical confidence level. The ranges that determine the scores and/or confidence levels may be user specified. Embodiments of the present specification can detect events of interest that have a short duration, such as in a range of 2 to 10 seconds, and small amplitude, such as in a range of 2% to 4%. In embodiments, any event exceeding a confidence threshold set by the clinician (or a system default) is processed using enhanced methods of the present specification. All other respiratory events may use conventional processing. All portions of the data which are not identified as events of interest are processed using conventional methods. Alternatively, in case of medium or typical confidence levels, conventional processing methods may be applied for processing the SpO2 data. The processor is configured to use the stored signals to detect short duration or small amplitude desaturation events that traditional pulse oximetry systems may eliminate as a result of time averaging signal processing and noise reduction techniques designed for other clinical settings. Conventional pulse oximeters may intentionally blunt the depth and slope of desaturation in longer duration desaturation events (60-180 seconds). The timing of a respiratory event across monitored signals is more precisely identified because certain data is not lost or obscured by noise filtering.

At step 444, the results for different confidence levels are generated for subsequent display to the user or clinician. The results may be generated in the form of histograms, numerical or graphical statistics, or any other form that indicates trigger of an event of interest. The results output a series of metrics related to the identified events. Each event of interest can be displayed with its associated confidence score, desaturation level, duration, and a processed pulse oximetry signal in accordance with the embodiments of the present specification.

Referring again to FIG. 4A, at step 408, the data generated for display is presented to the user or clinician for analysis. In some embodiments, results are displayed for all of the different types of confidence levels (for example, high, medium, and low). In other embodiments, results for a pre-selected confidence level are displayed. In embodiments, the user or clinician is able to select a review mode that corresponds to a confidence level to change the display. Changing the display at this step does not require reprocessing of data. In embodiments, one review mode may search for potential events of interest in a large (multi-hour) study while another mode may focus in-detail or on short duration, smaller amplitude changes in oxygen desaturation. At step 410, the user or clinician is able to perform a retrospective review of the physiological sleep data to identify Respiratory Disturbance Events (RDE) of potential interest with greater sensitivity and specificity. The user or clinician is then able to arrive at a decision about sleep disordered breathing. The data may enable the user to determine the presence of a disorder. Further, the data enables the user to determine severity of a disorder. The overall conclusion about the disorder may be influenced by one or more other factors as well including and not limited to presence of apnea, degree of desaturation, and patient symptomology.

Figure 6:
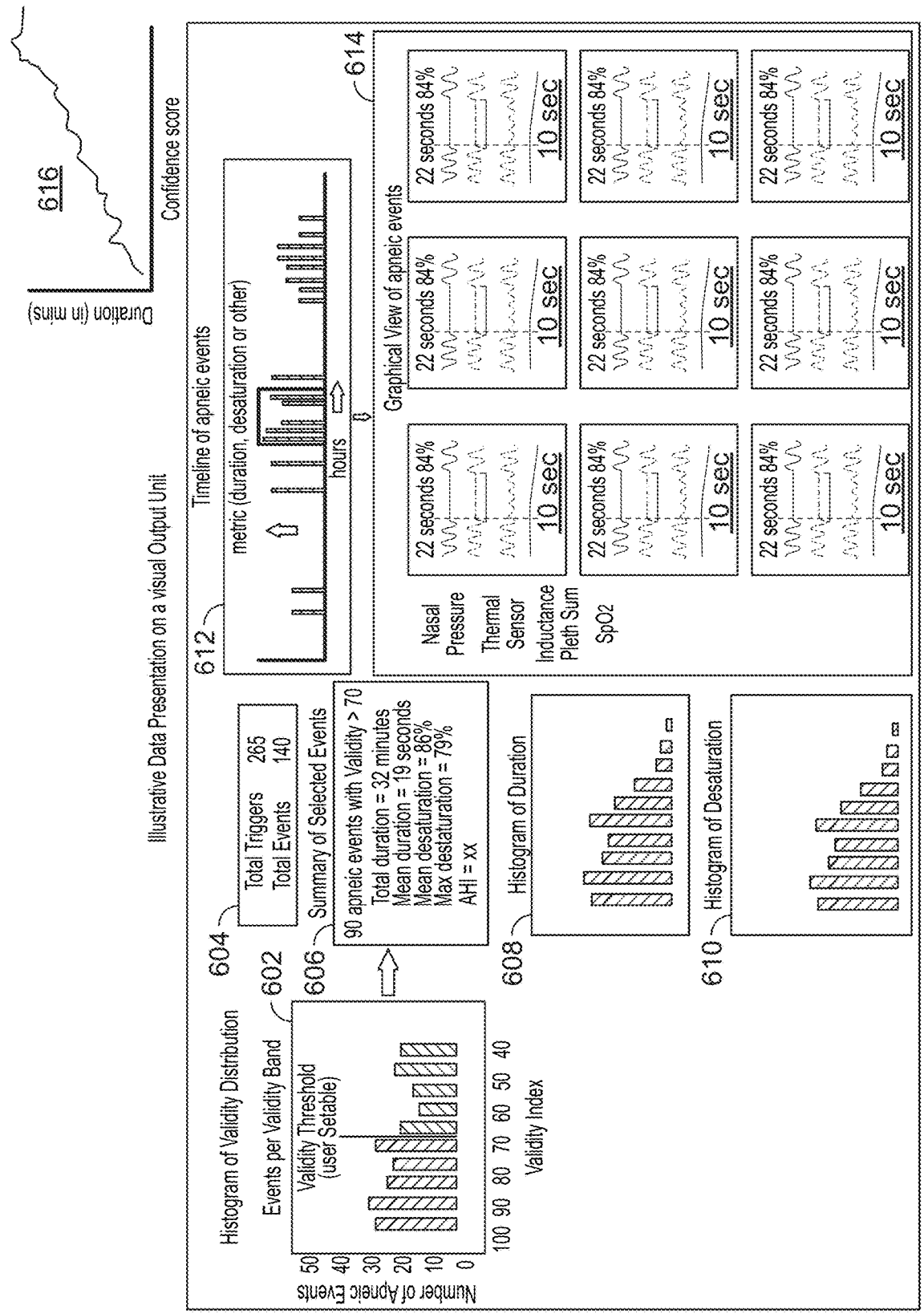
FIG. 6 illustrates tabular, textual, and graphical views of the event of interest data, in accordance with some embodiments of the present specification.

FIG. 6 illustrates exemplary data that may be presented on output unit 114, in accordance with some embodiments of the present specification. A graph 602 is a histogram of validity distribution. Interactive analysis offered by embodiments of the present specification, includes, and is not limited to, allowing the user or clinician to: a) set a confidence threshold (validity index); b) exclude respiration events below the threshold; and/or c) exclude individual events. In embodiments, if the user changes any relevant parameters, such as the confidence threshold, the histograms, summaries, and other views illustrated in FIG. 6, are also updated. In embodiments, a user or clinician may apply a "slider" to continuously adjust the desired confidence threshold. This selection would be used to update the graphical view of respiratory events, summary of the selected events, and histograms of duration and desaturation. Graph 602 shows a confidence threshold set at a value between 60 and 70, illustrating an analysis of respiratory events of interest that were identified as having confidence scores above the user-defined threshold. The number of respiratory events of interest, such as those that indicate occurrence of apnea, are marked with vertical bars for multiple values above and below the threshold. A box 604 displays total number of triggers and a total number of respiratory events of interest. A box 606 is a summary of the selected events that are identified above confidence score threshold. Box 606 indicates that 90 respiratory events were identified to be above the user-defined threshold. Additionally, statistical data for these events is shown, which includes total duration, mean duration, mean desaturation value, maximum desaturation value, among other data. A graph 608 displays a histogram of durations of the respiratory events. A graph 610 displays histogram of desaturation values of the respiratory events. A graph 612 displays a timeline of the respiratory events. The x-axis shows progress in time, while the y-axis shows a metric for each event over the time, where the metric is function of duration, desaturation level, or any other relevant parameter. A window 614 illustrates individual graphs for each respiratory event, where each graph compares the values of pulse oximeter measurements (SpO2) with corresponding values measured by other physiological sensors such as nasal pressure sensor, thermal sensor, and inductance plethysmograph. Graph 614 may also include a rate of desaturation for each event. A graph 616 shows the duration of respiratory events for various corresponding confidence scores calculated by the system. In embodiments other forms of graphical and statistical or numerical data are displayed by output unit 114.

Comparison Between Conventional and Enhanced SpO2 Calculations

Figure 7:
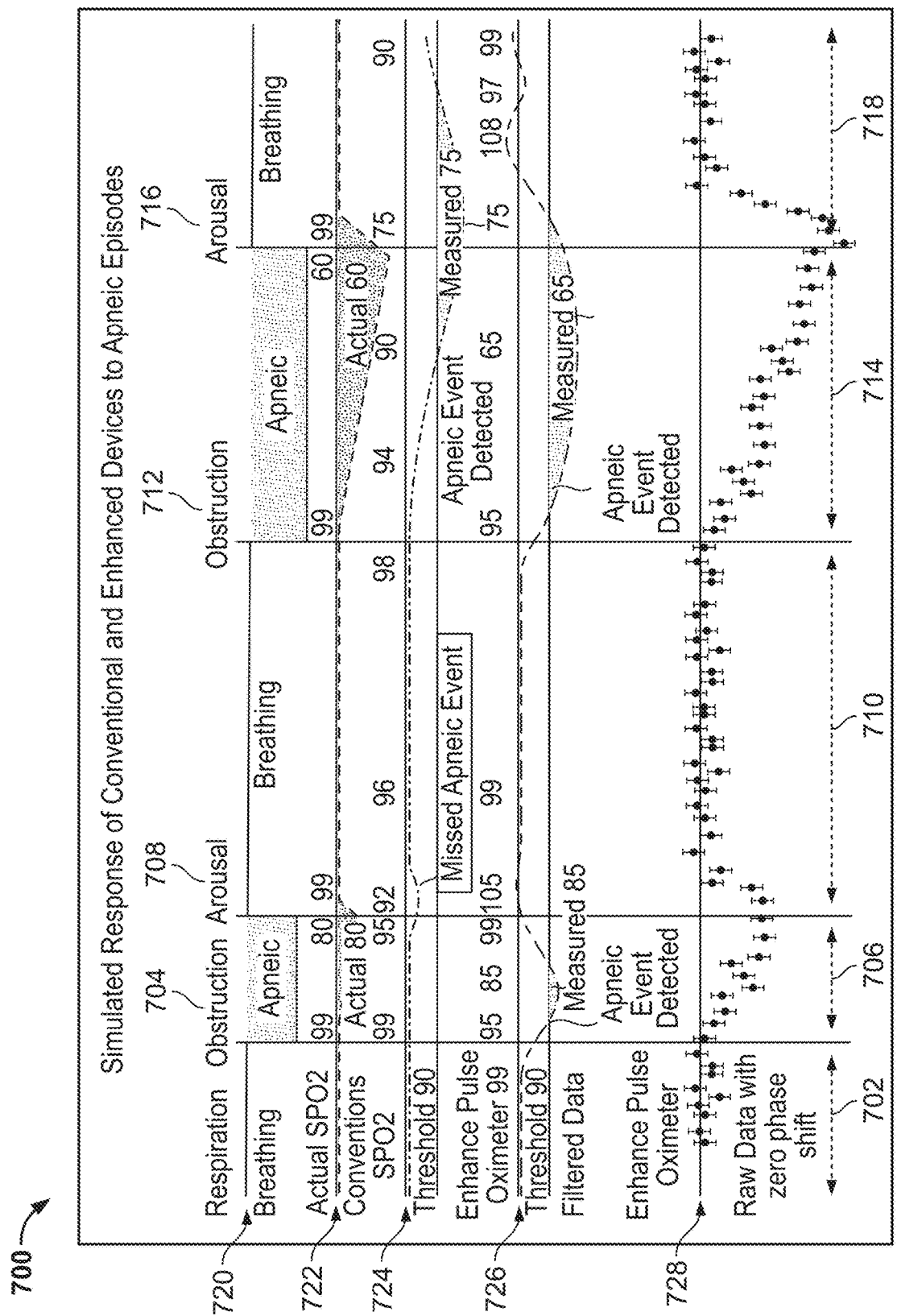
FIG. 7 illustrates a view of simulated responses of a conventional pulse oximeter and an enhanced pulse oximeter in accordance with some embodiments of the present specification, during apneic events.

FIG. 7 illustrates a view of simulated responses 700 of a conventional pulse oximeter and an enhanced pulse oximeter in accordance with some embodiments of the present specification, during respiratory events of interest. Referring to the figure, multiple graphical responses are divided over a period under different types of respiration events. A first column 702 lists the name of signals that are recorded in conventional and enhanced pulse oximetry systems. The remaining columns are identified based on the type of respiration or breathing simulated herein for the purpose of recording responses collected by the conventional and the enhanced pulse oximetry systems. A second column identifies a first obstruction 704 in the respiration, which is marked by the onset of a first apneic event 706. First apneic event 706 ends with first arousal 708 followed by resuming of breathing 710. Then, a second obstruction 712 leads to a second apneic event 714, which is of slightly longer duration than the first apneic event 706. Second apneic event 714 ends with a second arousal 716 followed by restoration of breathing 718. The breathing patterns are graphically illustrated in a first row 720.

A second row 722 illustrates a graphical representation of actual SpO2 measurements that occur in the blood during each of the above-stated respiratory events. As shown, SpO2 level is at 99% during breathing until the first obstruction 704 occurs. In the following apneic event 706, the actual SpO2 measurement (which is initially at a level of 99%), starts to decrease up to a level of 80%, by the time the event completes and first arousal 708 sets in. Post arousal 708, the SpO2 level quickly returns to 99% in a small window during breathing 710. After some time, second obstruction 712 occurs, which steadily dips SpO2 levels during second apneic event 714 to approximately 60%, when second arousal 716 sets in. Once again, SpO2 levels resume to 99% during breathing 718 after a small window in which the levels rise from 60% to 99%.

A third row 724 illustrates a graphical representation of SpO2 measurements taken by a conventional pulse oximeter. The pulse oximeter continuously records an oxygen level in the blood of a patient. Oxygen is recorded as a percentage of oxygen saturation of hemoglobin. Conventional pulse oximeters are designed and optimized to measure constant or slowly changing blood oxygen levels and generate an alert when levels drop. The pulse oximetry signals are filtered, decimated, averaged and artifact-reduced in real time (or near real time) to output a heart rate and percentage oxygen saturation. In order to provide stable readings and to prevent false alerts, the measured SpO2 signal is heavily filtered to remove artifact. While the data is stabilized, conventional pulse oximeters fail to track rapid but real changes in SpO2. An abrupt change in actual SpO2 level does settle to a final measured value for about 10 to 20 seconds. The alerts to such a drop are further delayed by an additional period. Referring to third row 724, the conventional pulse oximeter delays the measurement of SpO2 drop during first apneic event 706. At the time of first arousal 708, when actual SpO2 is 80%, measured SpO2 is approximately 95%, which is less than a preset threshold of 90% for the pulse oximeter. The threshold may be user or system defined, so that the system generates an alert only when the SpO2 measurement dips below the preset threshold. Additionally, during breathing 710, the measured SpO2 continues to drop to 92% and then rises gradually. The trough indicated by the measured SpO2 in row 724 during breathing 710 represents a missed apneic event. Since the measured SpO2 did not cross the preset threshold (of 90%), the event is not notified by the conventional pulse oximetry system. Rapid drop and recovery of SpO2 is missed, especially when the episode of desaturation is short, such as during first apneic event 706. Data that is relevant to a sleep disordered breathing diagnosis is lost in this processing. Therefore, conventional pulse oximetry systems may underreport the number and severity of apneic events.

After second obstruction 712, during second apneic event 714 which is of a longer duration relative to first apneic event 706, the conventional SpO2 measurement crosses the threshold and measures up to 75% after second arousal 716, whereas actual SpO2 at the time of second arousal 716 is 60%. Additionally, the measured SpO2 level gradually rises back to 99% during the following breathing 718, whereas the actual SpO2 resumes normal level within a short window.

A fourth row 726 illustrates a graphical representation of SpO2 measurements taken by an enhanced pulse oximeter system in accordance with embodiments of the present specification. Approximately halfway during first apneic event 706, the enhanced SpO2 measured is fast to reach its lowest level of 85%, after which it starts to rise and reaches the normal level of 99% at first arousal 708. Enhanced measured SpO2 may even rise further a little after arousal 708, to about 105% before resuming back to the normal level of 99% and initially in the duration of breathing 710. The lowest level of enhanced measured SpO2 is 85%, which is below the preset threshold of 90%, and therefore used by the enhanced pulse oximetry system to generate and alert about first apneic event 706. Again, after second obstruction 712, enhanced measured SpO2 promptly and steadily declines to reach the lowest value of 65%, after which the value begins to rise back. Filtered data from multiple physiological sensors, in addition to blood oxygen saturation data, is used to derive enhanced SpO2 measurements of row 726. Therefore, the enhanced measurements are more faithful in representing the actual SpO2 measurements.

A fifth row 728 illustrates the unconditioned pulse oximetry values with zero phase shift, which is derived from the enhanced pulse oximeter system. Conventional processing of pulse oximetry data introduces several seconds of delay to the desaturation/re-saturation event from actual timing due to the longer averaging window. Pulse oximetry data is inherently noisy (primarily due to motion), therefore conventional systems distort desaturation events as part of noise reduction. This means desaturations may be eliminated or represented with reduced depth and duration. The desaturation event timing is also shown as delayed by a few seconds from actual timing. Zero phase shift refers to the elimination of this delay, showing the desaturation event more accurately aligned with breathing activity and other sensor changes. Embodiments of the present specification enable more sophisticated processing of pulse oximetry data to provide an enhanced depiction of blood oxygen desaturation. Since sleep apnea, hypopnea (and other respiratory disturbance events) are evaluated, in part, on levels of desaturation and duration of events, reducing noise of pulse oximetry signals in a way that minimizes distortion has the potential to improve specificity and sensitivity of clinical testing. Desaturation events, especially mild ones, can be evaluated with greater confidence when they correlate in time to changes in other sensor data.

In embodiments of the present specification, the unconditioned pulse oximetry values shown in row 728 are stored, processed, and analyzed to generate the measured SpO2 signal shown in row 726. As used herein, unconditioned pulse oximetry values refers to stored digital samples of analog signals from photodetectors. The unconditioned pulse oximetry values do not include additional analyzing, normalization, or other functions. The unconditioned pulse oximetry values with zero phase shift are transferred to processing unit 108, by continuously streaming or in batch mode. The streamed data may contain many hours of recorded data from multiple types of sensors including unconditioned pulse oximetry values. The results displayed in row 726 are near real time or can be viewed in retrospect when reviewing the trends of recorded data.

Conventional SpO2 calculations are based on the phenomena of different color absorptions of oxygen saturated hemoglobin and desaturated hemoglobin. Wearable monitoring devices use LED transmitters to pass red and infrared (IR) light through the hemoglobin. The amount of light received at each wavelength of red and IR, is measured with an optical sensor. The monitoring device is worn or placed on two opposing sides of a body part, usually a finger or an ear lobe. The measurements are taken at the maximum and minimum of an arterial pulse. Concurrent measurements are also taken with both red and IR transmitters turned off.

The received light is calculated as follows:

light received=light intensity*length*(1+ k*percent*total hB)+background light wherein light intensity=brightness of each LED transmitter; length=thickness of finger or ear, which is identical for IR and red lights; k=factor that accounts for amount of hemoglobin in the sample which depends on vascularity and hematocrit and for light loss from skin and bone; and hB=hemoglobin.

During measurements, the arterial pulse changes the 'length' as the finger (or ear lobe) engorges slightly with each pulse. This provides three received values at each of two lengths. The three received values are one each for: when IR is on, when red is on, and when neither IR nor red is on. In practice, the change due to hB saturation is small compared to the changes in length. Skin color, background light, and movement affect the light signals with orders of magnitude greater than the change in hB saturation. The transmitters, photodetectors, signal processing and analog to digital converters additionally contribute to noise in the detected signal.

In conventional pulse oximeters the data is sampled at high rates (hundreds to thousands of times per second) at high resolution (up to 24 bits), to overcome the effects of above-stated sources such as skin color, background light, and other forms of noise. The light intensity and amplifier gains are adjusted to conserve battery life in portable equipment and to keep the signal within the dynamic range of the analog to digital converters. Further, background illumination is accounted for in part by sampling at exact multiples of 50 or 60 Hz. The timing of the arterial peaks and valleys is extracted from the signals. Six values are derived from product of signals when IR light is on, when red light is on, when none of the lights is on; and arterial peak value, arterial valley value. These six products are used to calculate the percent of hemoglobin which is oxygenated (SpO2 value).

Motion artifacts are estimated from abrupt changes in detected signal level, which are not likely due to pulse or hB changes. Segments of signal with such motion artifacts are discarded in the calculations. Further, arterial pulse peaks and valleys are located and signals outside these two times of interest are discarded. The remaining signal with noise is averaged or filtered until the measurement is stable. Typically, a precision of 1% is targeted in the stabilized signal. The resulting SpO2 measurement is then updated once or twice per second with nominal 8 bits of resolution. The displayed measurement lags the actual SpO2 by several seconds and intentionally eliminates SpO2 changes until they meet multiple criteria. The update rates and displayed values are human factors that give the appearance of stability, accuracy and responsiveness, but do not reflect short term changes in SpO2.

The enhanced pulse oximetry system of the present specification also uses the differential absorption of red and IR lights to calculate oxygen saturated hemoglobin and desaturated hemoglobin. The calculation steps are similar to that of conventional pulse oximeters using the six signals as described previously. Data from the six signals is filtered and decimated to a lower sample rate, typically about 100 Hz (and not exact multiples of 50 or 60 Hz, as performed by conventional pulse oximeters). A modest amount of compression reduces the data to about 16 bits of resolution. The three raw or unconditioned signals—when IR is on, when red is on, and when neither is on—are first stored at the nominal 100 Hz rate. SpO2 is not calculated at this point, unlike the conventional pulse oximeters. The unconditioned pulse oximetry values are stored, and streamed either continuously or in batches, to a computing system (see FIG. 1). The raw data may include, in addition to unconditioned pulse oximetry values, data from other physiological sensors such as and not limited to nasal pressure sensor, inductance plethysmograph, accelerometer, thermistor, humidity sensor, resistive sensor, polyvinylidene fluoride (PVDF) sensor, electroencephalogram, eye movement sensor, body position sensor, motion sensor, heart rate sensor, audio sensor, or video sensor.

In some embodiments, an ECG lead wire is also connected, which provides ECG data that is used to independently synchronize the arterial pulse. In some embodiments, data includes eye movements in combination with data from EEG channels, which is used to identify sleep stage during REM. Movements do not occur during REM, therefore enabling less disruptive movement detection algorithms for this interval. Therefore, in embodiments, one or more of ECG, eye movement, EEG, and/or actigraphic data is captured and time synchronized to the acquired oximetry data. It should be appreciated that actigraphic data may be derived from an actigraph unit or actimetry sensor configured to monitor human rest and activity cycles. The actigraphic data provides a direct indication of whether there are gross body movements that should be accounted for in processing the displayed SpO2 calculation from the "raw oximetry data".

ECG is matched against both the plethysmographic waveform and the calculated heart rate to determine whether changes in the calculations are physiologically derived or whether they are a result of artifact. EEG, eye movement and other electro-physiological derivations are used to determine whether significant changes occur in wake, sleep, or particular states of sleep (such as REM sleep) that may be more susceptible to oxygen desaturations due to a normal process of autonomic paralysis during those periods of sleep. The time synchronized data may also be used to look for other conditions that may have an impact on what is expected to be seen in the algorithm in order to determine whether to apply a more conservative algorithm (preventing rapid changes in detected SpO2 values that are estimated to occur at a time conducive to artifact, such as movement), or to allow for a more aggressive and rapid display of SpO2 values (indications that estimate there may be actual physiological compromise to the respiratory and or circulatory system). Storage of unconditioned pulse oximetry values and generation of batches of data (that includes data collected over time) enables a user to subsequently view processed data in near real time or in retrospect.

Processing unit in the computing system evaluates respiration, and air flow, from the received unconditioned pulse oximetry values, and locates respiratory events of interest. The enhanced SpO2 level is calculated on a beat per beat basis using zero phase shift analyzing. The underlying algorithm is the same as that used by conventional pulse oximetry systems (based on the six values derived from the product of signals when IR light is on, when red light is on, when none of the lights are on, arterial peak value, and arterial valley value). Conventionally, systems apply two separate algorithms at the same time: a first algorithm that converts the received light values to SpO2 and a second algorithm that uses a selected amount of prior SpO2 values to adjust the reported SpO2 value (to eliminate small sudden changes which are likely due to the motion of a patient). Conventional pulse oximetry systems feedback previous SpO2 levels into the algorithm. The enhanced system of the present specification uses a similar approach for converting the received light signal into SpO2 information yet has a more complex algorithm for selecting the amount of prior SpO2 values and assigning a weight to these values for influencing any discrete time value of SpO2 level. The enhanced pulse oximetry systems of the present specification dynamically adjust the number of historical inputs into the algorithm based on clinical user selection (as described above), coincident data from other sensors, and/or patient conditions. Thus, the enhanced pulse oximetry systems of the present specification are configured to more accurately track SpO2 levels both during desaturation events when a less filtered and more aggressive acceptance of new incoming readings from the prior art algorithm is desired, and during movement events when application of more conservative and historically informed algorithms is desired in order to not provide false readings during transient or non-physiologically derived changes in the SpO2 calculation.

Additionally, an expected SpO2 decline and recovery during apneic events is compared to the measured SpO2 to reduce artifact susceptibility. Some methods for determining current SpO2 levels include the drawing of arterial blood gases, which captures a single moment in time, specifically, at the time of the draw. Due to the normal use-case of oximetry used in patient monitoring in hospitals and other clinical settings, the standard oximetry routine has been more concerned about not false alarming due to artifact caused by movement. The use of oximetry in clinical sleep is unique in attempting to track expected desaturations observed after apneic events. These may be observed even in traditional oximeters, but the response curve is muted by the application of an algorithm intended to prevent movement artifact. The algorithm that is used in the present specification is configured to enable, at those specifically desired times, to turn off the analyzing during apneic events, to see a more rapid and unmuted decline in the SpO2 levels of a patient without allowing the historicity of the signal to dictate displayed value. Therefore, it is determined, based on the presence of other conditions, when the shift in number might be related to non-clinical parameters (such as gross body movements), or expected due to patient sleep state (autonomic paralysis during REM sleep), or based on preceding respiratory events. Embodiments of the present specification enable the current artifact algorithms to be applied at times when it is desirably and dynamically turned off at times when they are interrupting accurate clinical data to get a better estimation of the actual expected SpO2 decline. Therefore, the resulting SpO2 values more accurately track the actual SpO2 levels. When the desaturation threshold is reached (for example, 90% as described with reference to FIG. 7), the algorithm verifies that it is either maintained or increases until a desaturation duration threshold is reached. In embodiments of the enhanced SpO2 measurement system, short duration apneic events are caught, and the onset of desaturation and recovery timing and depth are better defined when compared to conventional measurement systems and methods.

Existing pulse oximetry signal processing methods and systems are optimized for patient monitoring settings where clinicians are provided with notice of persistent desaturation events where timely intervention is critical to patient health. Additionally, raw pulse oximetry signals are inherently poor quality due to factors such as motion, ambient light, perfusion, skin thickness and skin tone variations, nail polish use, among other factors. Embodiments of the present specification overcome the limitations of the existing systems by avoiding false reporting of desaturation events that do not require intervention and are not relevant to the medical setting. This is achieved since time averaging and other noise-reducing signal processing is applied to the pulse oximetry signals in real time or near real time.

Embodiments of the enhanced pulse oximetry system of the present specification can be configured as part of a PSG, HSAT, sleep oximetry, or sleep test aid, to enable diagnosis of sleep disordered breathing. The system of the present specification can be used for multiple patients and for diagnosing a variety of sleeping disorders. The sleeping disorders that are diagnosed by the present specification may include, and are not limited to, insomnia, snoring apnea, and sleep apnea, or any other disorder that interferes with breathing during sleep. Furthermore, the techniques of the present specification described in the context of sleep testing can be applied in various fields where other physiological sensor data is available and traditional pulse oximetry processing may be obscuring useful information related to oxygen desaturation. In one embodiment, the present specification is applicable for use in challenging conditions such as high altitude aircrafts.

The above examples are merely illustrative of the many applications of the systems and methods of the present specification. Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Likewise, the figures may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations. Thus, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A pulse oximetry system configured to detect a respiratory event, comprising:
    an acquisition unit for acquiring unconditioned oximetry values comprising digital samples of raw oximetry values, wherein the digital samples have not been subject to normalization or filtering and at least one other physiological sensor data;
    a storage unit for storing the unconditioned oximetry values and at least one other physiological sensor data;
    a processor configured to receive and process the stored unconditioned oximetry values and the at least one other physiological sensor data, correlate the unconditioned pulse oximetry values with the at least one other physiological sensor data, detect at least one desaturation event having a time range of 2-10 seconds and/or an amplitude of 2%-4%, and associate a confidence score with each respiratory event of interest based on said correlation; and
    an output unit configured to visually display the detected at least one desaturation event and the associated confidence score.

2. The pulse oximetry system of claim 1, wherein the processor comprises:
    a first processing unit to correlate the unconditioned oximetry values with the at least one other physiological sensor data and detect said at least one desaturation event having the time range of 2-10 seconds and/or the amplitude of 2%-4%; and
    a second processing unit to process each respiratory event of interest and associate the confidence score with each respiratory event of interest.

3. The pulse oximetry system of claim 2 wherein the confidence score is determined based on one or more of a number of the at least one other physiological sensor data, quality of the data from the at least one other physiological sensor, the correlation of the unconditioned oximetry values with the at least one other physiological sensor data, duration of the respiratory event of interest, and a minimum desaturation level.

4. The pulse oximetry system of claim 1, wherein the at least one other physiological sensor data comprises data generated by one or more of a nasal pressure sensor, a thermal sensor, a humidity sensor, a resistive sensor, an inductance plethysmograph, a polyvinylidene fluoride (PVDF) sensor, an accelerometer, an electroencephalogram, an eye movement sensor, a body position sensor, a motion sensor, a heart rate sensor, an audio sensor, or a video sensor.

5. The pulse oximetry system of claim 1, wherein the processor is configured to detect short duration amplitude desaturation events and long duration desaturation events simultaneously.

6. The pulse oximetry system of claim 1 wherein the unconditioned pulse oximetry values are sourced from a sensor comprising at least one of an infrared sensor, an optical sensor, and a red light sensor.

7. The pulse oximetry system of claim 1 wherein the unconditioned pulse oximetry values comprise digital samples of analog signals from one or more photodetectors.

8. The pulse oximetry system of claim 1 wherein the output unit is configured to display a list of the respiratory events of interest, each with at least one of data indicative of a desaturation level, data indicative of a duration, or data indicative of a processed pulse oximetry signal.

9. A method of detecting sleep disordered breathing, comprising:
    acquiring sleep test data comprising unconditioned oximetry values, wherein the unconditioned oximetry values comprise digital samples of raw oximetry values that have not been subject to normalization or filtering, and at least one other physiological sensor data;
    storing the acquired sleep test data;
    correlating the unconditioned oximetry values and the at least one other physiological sensor data, wherein the at least one other physiological sensor data comprises one or more of nasal pressure data, EEG data, and body motion signal data;
    determining one or more desaturation events having a time range of 2-10 seconds and/or amplitude desaturation events of 2-4% from the correlating;
    associating a confidence score to each of the one or more desaturation events based on said correlation; and
    visually displaying the one or more desaturation events and the confidence scores associated therewith.

10. The method of claim 9 wherein the confidence score is based on one or more of a number of the at least one other physiological sensor data, quality of the data from the at least one other physiological sensor, the correlation of the unconditioned oximetry values with the at least one other physiological sensor data, duration of the respiratory event of interest, or a minimum desaturation level.

11. The method of claim 9, wherein the at least one other physiological sensor data comprises data from one or more of a nasal pressure sensor, a thermal sensor, a humidity sensor, a resistive sensor, an inductance plethysmograph, a polyvinylidene (PVDF) sensor, an accelerometer, an electroencephalogram, an eye movement sensor, a body position sensor, a motion sensor, a heart rate sensor, an audio sensor, or a video sensor.

12. The method of claim 9 wherein the determining comprises:
    in a time forward direction and at start of each the one or more desaturation events, using short term averaging to determine a desaturation level and a lowest saturation level measured;
    correlating a portion of data after desaturation which includes re-saturation with the unconditioned oximetry values;
    correlating a data when the re-saturation is complete with the unconditioned oximetry values; and
    in a time-reverse direction, calculating a slope of re-saturation.

13. The method of claim 12 wherein the calculating the slope of re- saturation comprises identifying an interpolated portion of the one or more desaturation events.

14. The method of claim 9 wherein the unconditioned pulse oximetry data comprises digital samples of analog signals from one or more photodetectors.

15. The method of claim 9 wherein the visually displaying comprises displaying a list of respiratory events of interest, each with at least one of data indicative of a desaturation level, data indicative of a duration, or data indicative of a processed pulse oximetry signal.

16. The method of claim 9, wherein determining comprises detecting short duration amplitude desaturation events and long duration desaturation events simultaneously.

\* \* \* \* \*